United States Patent [19]

Medill et al.

[11] 3,789,152

[45] Jan. 29, 1974

[54] DATA FORMAT CONVERTER

[75] Inventors: David Gordon Medill, Denver; John Francis O'Neill, Boulder, both of Colo.

[73] Assignee: Bell Telephone Laboratories, Incorporated, Murray Hill, N.J.

[22] Filed: Dec. 11, 1972

[21] Appl. No.: 313,952

[52] U.S. Cl. ................................ 179/99, 179/18 T

[51] Int. Cl. ........................................ H04m 1/00

[58] Field of Search .... 179/99, 18 AD, 15 BY, 18 J

[56] References Cited

UNITED STATES PATENTS

| | | | |
|---|---|---|---|
| 3,647,980 | 3/1972 | Fabiand | 179/99 |
| 3,519,757 | 7/1970 | Anderson | 179/18 J |
| 3,715,516 | 2/1973 | Ebrahimi | 179/99 |
| 3,239,610 | 3/1966 | Morse | 179/99 |

*Primary Examiner*—Kathleen H. Claffy
*Assistant Examiner*—David L. Stewart
*Attorney, Agent, or Firm*—H. R. Popper

[57] ABSTRACT

An electronic key telephone system is disclosed in which both conventional telephone sets as well as electronic key telephone sets are served. The electronic telephone sets transmit switchhook status and receive ringing control information over a data link to a main controller but the conventional telephone sets must receive ringing signals over the talking path. While it is expected that most sets will be of the electronic type, a few conventional sets will likely have to be served in many practical installations. In order that the main controller be able to process network connections for both types of telephone sets without having to be reprogrammed when the distribution of telephone set types is changed, an interface circuit is provided for use with the conventional, no-button sets. This interface circuit receives supervision information from the port circuit serving the no-button station set and transmits it as a compelled response pulse during an appropriate one of the multibit pulse sequences by means of which the main controller communicates with the port circuit serving the electronic key telephone sets.

9 Claims, 22 Drawing Figures

PATENTED JAN 29 1974 3,789,152

SHEET 08 OF 21

NETWORK CONTROL

DATA FORMAT CONVERTER

BACKGROUND OF THE INVENTION

This invention relates to telephone switching systems and more particularly to a telephone system for serving telephone sets having pick-up keys for obtaining access to a plurality of lines as well as telephone sets lacking such pick-up keys.

In the evolution of telephone switching systems, there is now known a type of key system in which only a fixed minimum number of wires need be cabled out to the key telephone set regardless of the number of line pick-up keys with which the set is equipped. This reduction in amount of key set cabling has been made possible by dedicating certain of the wires in the cable to the performance of speech path communication and certain others of the wires to data control functions such as transmitting lamp or ringer control signals, operated key button identity and/or call signaling information. The operated key button identity transmitted over the data conductors is employed to control a local switching network to connect the "tip and ring" of the telephone set with the "tip and ring" of the designated line. The reduction in cabling and the use of data links necessitates that a central or main control unit be provided which, in association with the local switching network, will provide the controlling signals for the establishment of the requisite network connections and the transmission to the station sets of the needed control impulses.

When a particular customer or number of customers is served by an electronic key system arrangement of the foregoing type, it may be expected that the customer will not require that everyone of his telephone sets must have"pick-up key" access to more than one telephone line. For example, some customers' installations may require that one or more conventional telephones not having pickup keys be served. These telephones must be provided with conventional tip-and-ring ringing. The design of the system which serves these varied needs should not require the customer to pay for more complicated central control or station set equipment than is required to fulfill the detailed needs of the respective customer. Accordingly, any practical electronic key telephone system must make provision for serving not only the sophisticated electronic key telephone sets that are equipped with data link access to the common control equipment but also conventional telephone sets which merely have a single pair of tip and ring conductors extending to and appearing in the local switching network.

In the design of an electronic key telephone system, economies in the construction of the common control equipment are naturally to be achieved when the fewest number of design deviations have to be executed for each of the different types of telephone sets being served. In the envisioned arrangement, the electronic key telephone sets normally communicate key button identity and ringing control information with the common control unit over the data link conductors. Conventional sets require no such key control information and it is desireable that the common control unit be designed to be independent of the number and type of telephone sets that may be served by the network in any particular installation. (Other aspects of the illustrative electronic key telephone system are disclosed in the co-pending applications of D. G. Medill Ser. No. 313,955; T. G. Lewis Ser. No. 313,953; and J. O. Dimmick-L. P. Fabiano, Jr.-T. G. Lewis J. F. O'Neill Ser. No. 313,956; all filed of even date herewith.)

Each of the telephone station sets, whether conventional or of the electronic key variety, and each of the central office lines is provided with a port circuit by means of which the station or line is given an appearance in the local switching network. The station port circuit performs the function of receiving supervisory signals from the station set and of transmitting control information from the main controller to the station set. A port circuit serving an electronic key telephone set performs the additional control functions with regard to the data transmitted on the data link. Inasmuch as the central or main controller may from time to time be required to operate with different numbers of electronic key telephone sets as well as conventional telephone sets, it is considered undesirable to require that the operational sequences undertaken by the main controller have to be altered as the relative number of electronic and conventional telephone sets is changed from time to time. On the contrary, it is desired that the main controller be organized to operate in a manner dictated by the preponderant type of telephone set, namely, the electronic telephone set.

It is an object of the present invention to permit the common or main controller to serve both conventional and electronic key telephone sets equipped with the data link in substantially the same manner so that the operation of the main controller need not be adjusted to reflect either the particular number of or the fact that some conventional telephone sets may also have to be served at any given time by the system.

SUMMARY OF THE INVENTION

In accordance with an illustrative embodiment of our invention, we provide an interface circuit for each group of station port circuits serving conventional telephone sets in the electronic key telephone system. This interface circuit (hereinafter sometimes called a centerboard circuit) receives the switchhook supervisory information from port circuits serving conventional telephone sets. The main controller in the illustrative arrangement is designed to communicate with the port circuits serving electronic key telephone sets by means of a three-bit data pulse sequence. Each bit of the sequence elicits a compelled response from a data transmitter-receiver associated with the data link to a respective electronic key telephone set. The centerboard circuit of our invention responds to the three-bit sequence to generate compelled responses during two of the three bits. These responses verify the normal circuit continuity expected to be received by the main controller when communicating with electronic port circuits. The centerboard circuit, however, responds to the remaining data pulse by forwarding supervisory state information elicited from the port circuit serving the conventional telephone set so that the main controller will be unaware of the fact that the information relates to such a set. In this manner the distribution of port circuits serving electronic and conventional telephone sets may be changed without need of reprogramming the main controller.

In one illustrative embodiment of our invention, the selection of any one of the plurality of conventional telephone sets primes a flip-flop circuit to be set by the first bit of the three-bit data sequence sent by the main controller to the port circuits. It is an aspect of the operation of this embodiment that the data response conductors be energized according to a predetermined pattern during the data response interval. The setting of this flip-flop enables a gate connected to a switchhook supervisory lead common to the conventional telephone sets to forward the switchhook supervisory state to the conductors of the data response bus when the second bit of the three-bit data sequence arrives. At this time, the flip-flop is reset by the second bit so that upon the arrival of the third bit of the three-bit data sequence, a bit which also is normally only applicable to port circuits serving electronic key telephone sets will be returned in the aforementioned predetermined manner to the data response conductors. In this manner, port circuits serving electronic key telephone sets and those serving conventional key telephone sets will return a three-bit response to the main controller, both types of port circuits responding with actual switchhook information during the intermediate bit of the sequence but those serving conventional telephone sets will respond with a predetermined pattern of energization during the first and last bits of the sequence.

BRIEF DESCRIPTION OF THE DRAWING

The foregoing and other features of our invention may become more apparent by referring now to the drawing in which:

FIGS. 1–13 are to be arranged.

GENERAL SYSTEM DESCRIPTION

Figure 1:
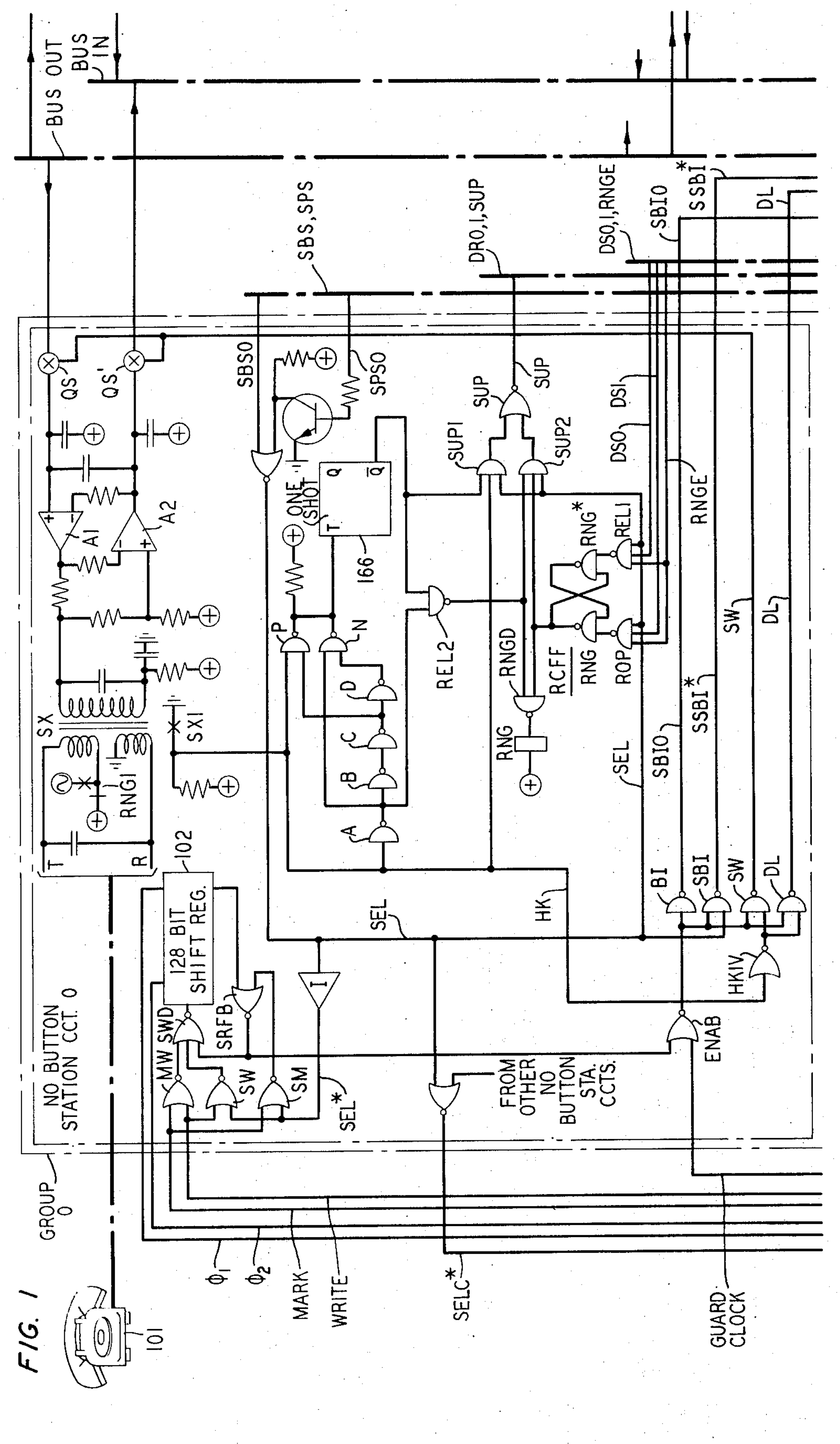
FIG. 1 shows a station port circuit for serving a conventional "no-button" telephone set.

The electronic key telephone system in which the present invention may be employed includes a plurality of electronic key telephone stations 203, 263 FIG. 2 and 400, 463 FIG. 4. Each of the electronic key telephone sets is connected to a station port circuit which is part of the centralized key telephone system equipment serving all of the key telephone sets belonging to a telephone customer or to a group of key telephone customers in a given location such as a small building or one or more floors of a large building. Each of the conventional non-key telephone sets 101, FIG. 1 served by the system is connected to a station port circuit for "no-button" sets which circuit communicates with the main controller FIG. 12 via sequencer 1120, FIG. 11 in the same fashion as port circuits for the electronic telephine sets. Typically, the electronic key system described herein may serve up to approximately 512 stations and 512 lines or trunks for a total of 1,024 interconnectable ports.

In the ensuing description, the station, line, and trunk circuits having appearances in the switching network will from time to time be referred to as ports. The interconnection of ports is accomplished by time division switching, each port being equipped with a recirculating shift register having a single bit for defining the time slot during which interconnection to that port can be made in the system. A pair of time division buses respectively designated IN bus and OUT bus are employed, signals on the bus being summed in a summing amplifier Σ, FIG. 4, and applied to the OUT bus.

Unlike time division switching systems designed for central office use or for conventional private branch exchange service use, time slots on the IN bus and OUT bus may be assigned to any number of ports so that functionally any number of ports belonging to lines or stations may be interconnected at the same time. This feature is provided to permit more than one station simultaneously to "pick up" the same line and thereby permits both bridging and conferencing. Each port circuit is equipped with a respective switch for connecting the port to the IN bus and the OUT bus and the switches are simultaneously controlled by the output of the port circuit's shift register.

The port circuits, such as the station port circuits of FIGS. 1–4, are arranged in groups of 64. Each group of port circuits is served by a "center board circuit," FIG. 3, which is provided for receiving an address signal from the network controller designating the group of port circuits and for decoding relative addresss signals to select the particular port circuit in the group. A center board circuit may also serve port circuits within a group that accommodate conventional telephone sets. In this case the center board circuit allows the main controller to communicate with these port circuits, in the same manner that it does with port circuits serving the electronic telephone sets of the system.

The port circuits serving stations receive station control data from the central control sequencer (FIG. 11) over buses DSO, 1 and RNGE, and return data over buses DRO, 1. Each group of 64 port circuits serving stations reports the busy/idle states of its respective stations over a distinctively numbered station busy/idle bus SBI-. In addition, a common selected busy-idle bus SSBI serves all of the station circuits.

Figure 5:
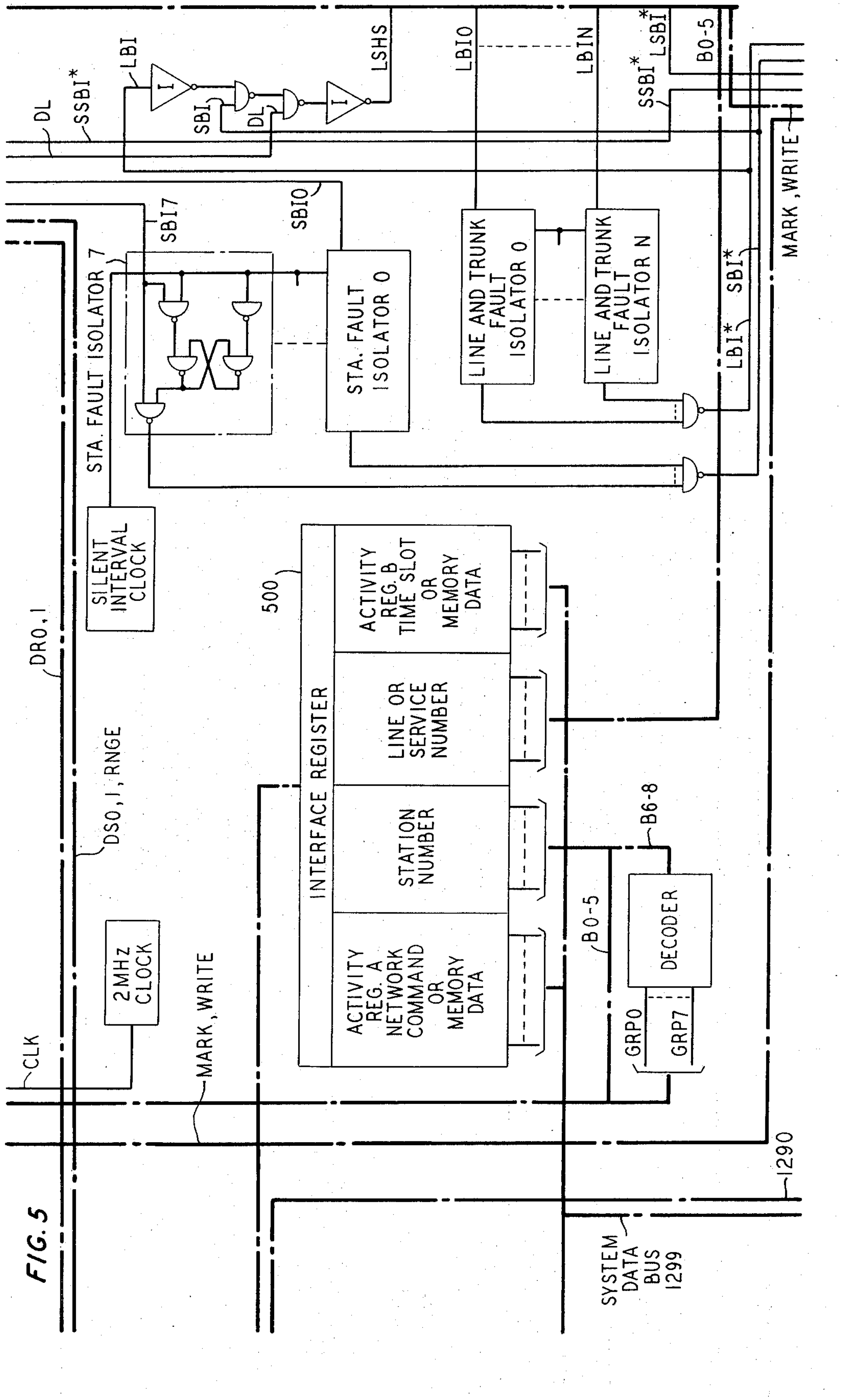
FIG. 5 shows the interface register and fault isolators of the illustrative key telephone system.

The two distinctive types of busy/idle bus systems eliminate the need for the central control to be equipped with a central memory for storing the assignment of busy and idle time slots. Instead, busy/idle information is directly obtained from the port circuits. To determine if a particular time slot is busy or idle, the status of the different station busy/idle buses SBIO through SBI7 is monitored. If any of these buses exhibits a low signal condition during the active interval of the time slot, it is to be understood that the time slot is assigned to one of the station port circuits associated with the particular station busy/idle bus SBI-. To determine whether a particular station is assigned a particular time slot, the station selected busy/idle bus SSBI in monitored during a frame of time slots when the particular station is addressed over the address buses from the interface register (FIG. 5). The station selected busy/idle bus SSBI exhibits a low signal state during the active interval of the time slot assigned to the addressed station port.

Central control addresses the port circuits by applying patterns of 0 and 1 bits to the MARK, WRITE and SELC buses appearing at the left-hand side of each of the station port circuits of FIGS. 1 through 5. The addressing of a port circuit results in the entering of a single bit into the port shift register circuit in accordance with the following table:

| MARK | WRITE | SELECT | FUNCTION |
|---|---|---|---|
| 0 | 0 | 0 | (NOT USED) |
| 0 | 1 | 0 | WRITE 1 |
| 1 | 0 | 0 | SELECTED WRITE 0 |
| 1 | 1 | 0 | RECIRCULATE |
| 0 | 0 | 1 | NONSELECTED WRITE 0 |
| 0 | 1 | 1 | RECIRCULATE |
| 1 | 0 | 1 | RECIRCULATE |
| 1 | 1 | 1 | RECIRCULATE |

From the above table it can be seen that there are two modes of write zero into a port shift register. One of these modes employs a bit on the select lead and the other mode does not. The second mode of writing zero into a port shift register is an "unselected clear" and is used by the central control to clear a particular time slot from every register in the system at once by writing 0 in the same stage of every port circuit shift register.

Figure 7:
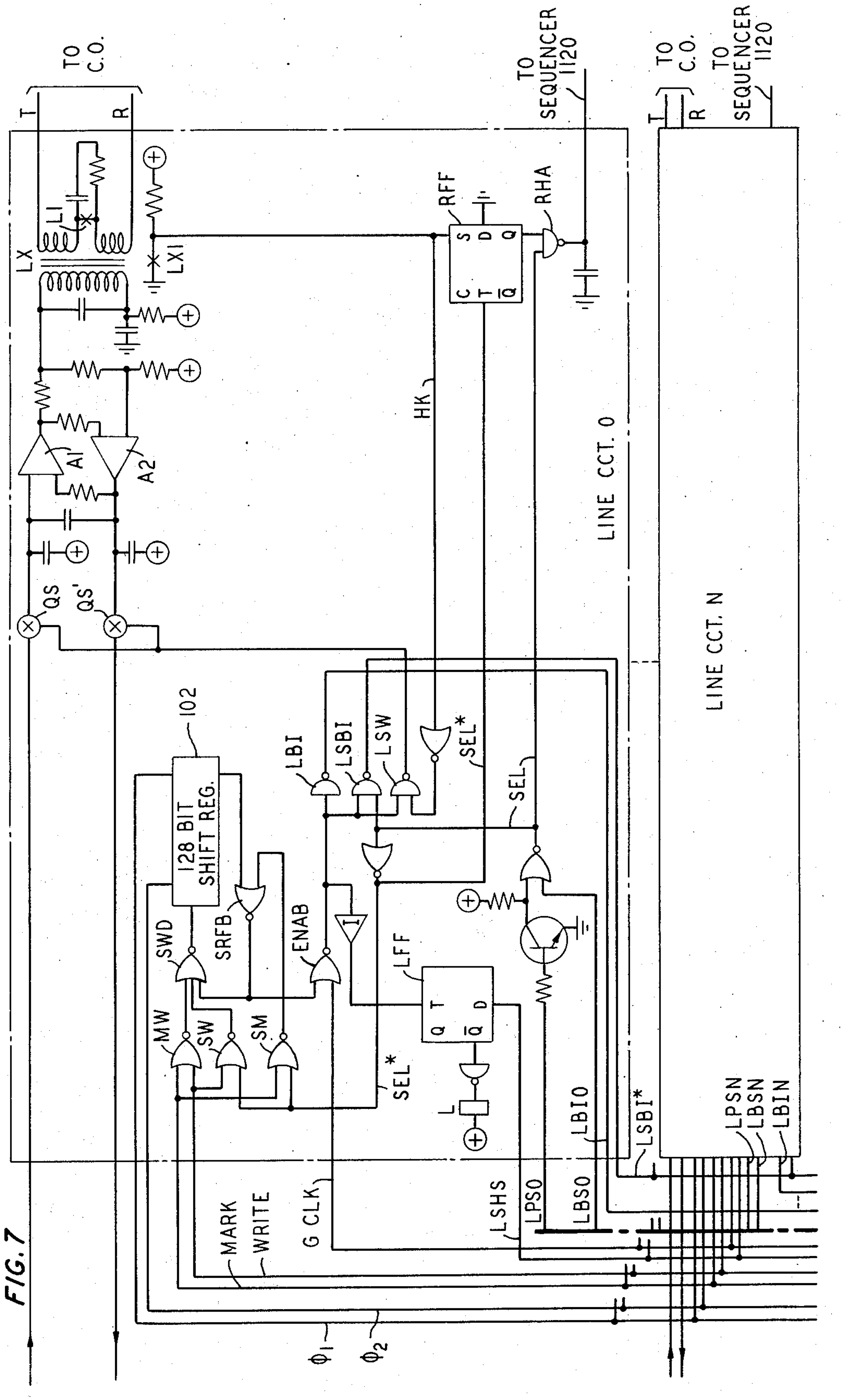
FIGS. 7 and 8 show respectively a line port and line centerboard circuit.
Figure 8:
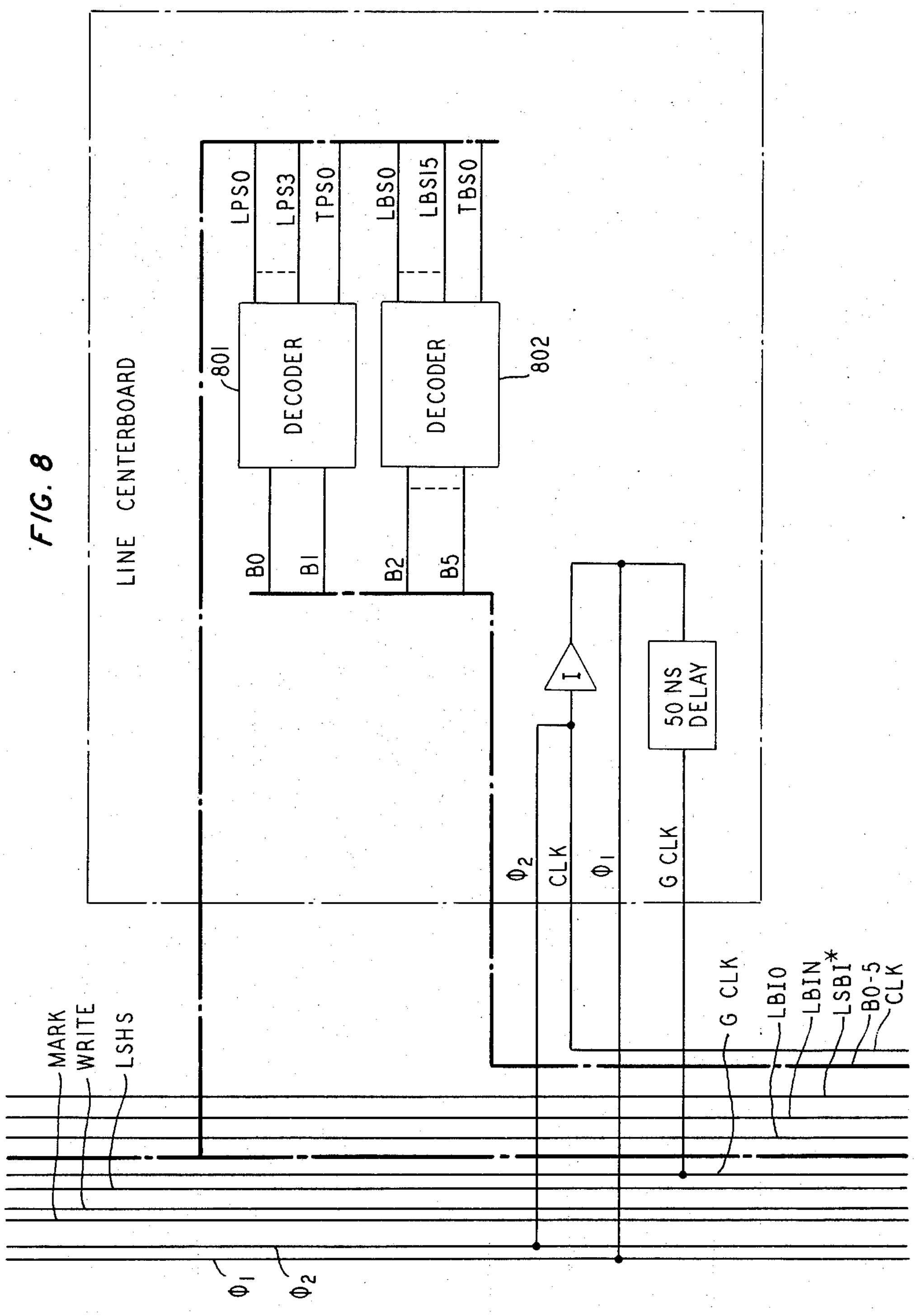

The arrangement of the electronic key telephone system shown in the drawing is such as to permit direct transmission of dial pulsing from the telephone set and station port circuit to a selected line circuit over a synchronous time division bus which includes conductor DL shown at the right-hand side of each of FIGS. 1 through 5 and conductor LSHS appearing at the left-hand side of FIGS. 7 and 8. For station sets that are equipped as disclosed in H. P. Anderson, et al. U.S. Pat. No. 3,701,854 issued Oct. 31, 1972 for "dialing in the data stream," i.e., those in which the multifrequency push buttons of the set generate the normal tone signals and also transmit binary-coded representations corresponding thereto over the data link to the port circuits data transmitter and receiver, the binary-coded call signaling information is entered into data transmitter-receiver 202 of the station port circuit and forwarded over leads DRO,1 to the main controller and therein interpreted to effect appropriate network control.

STATION PORT CIRCUITS (FIGS. 1, 2)

The port circuit shift register 102 defines a 500 nanosecond interval for its associated time division communications bus switches QS and QS'. The first half of the interval is a turn-on pulse that enables the port switches to close thereby connecting the port to communications buses BUSIN and BUSOUT. The 250-nanosecond speech sample interval is followed by a 250-nanosecond quiet interval on the bus to provide cross-talk protection between adjacent time slots. Within shift register 102 a single bit is circulated stage to stage at a 2-megacycle repetition rate to define the 500-nanosecond output control interval. The 500 nanosecond control interval repeated once every 64.5 microseconds yields a 15.6 kHz sampling rate for the port.

Figure 2:
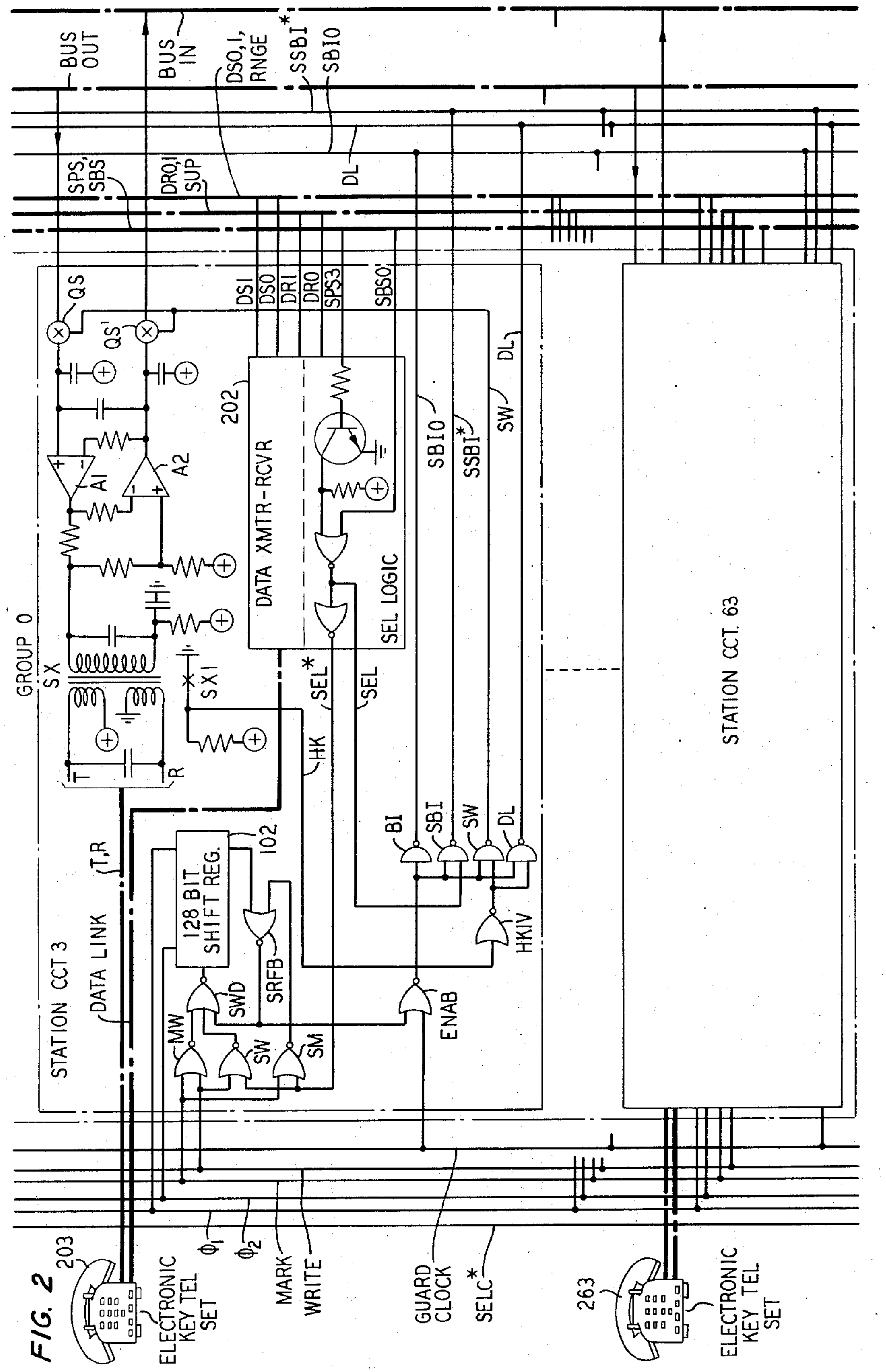
FIG. 2 shows a station port circuit for serving an electronic telephone set.
Figure 4:
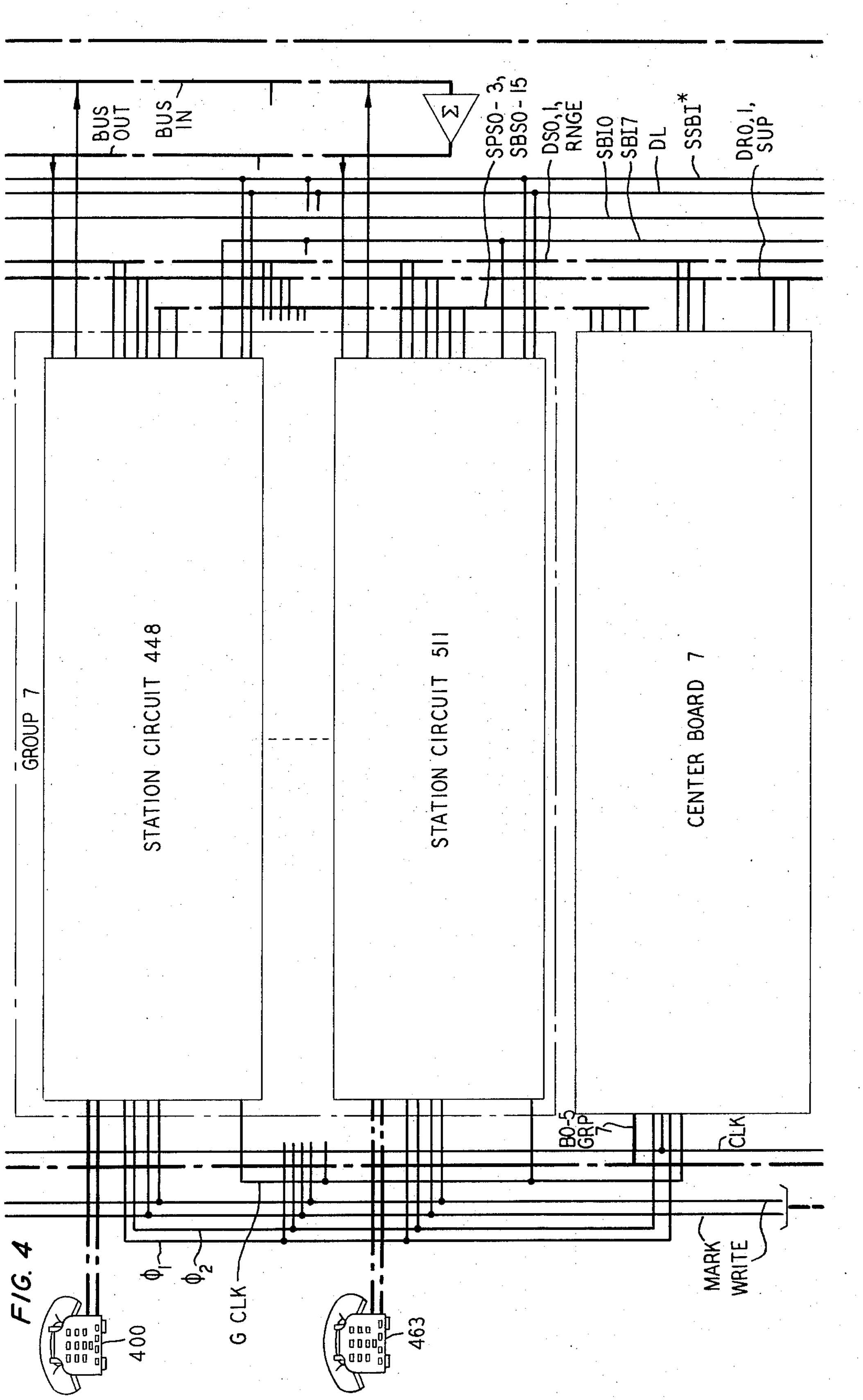
FIG. 4 shows the arrangement of a group of station port circuits with an associated interface circuit.

The coupling of the port to the input and output of the summing amplifier Σ FIG. 4 allows the port to put analog speech samples on BUSIN of the speech bus system for a 250-nanosecond interval and to receive analog speech samples over BUSOUT from any other port in the system. Referring to FIG. 2, station port circuit 3 includes a pair of time division sampling switches QS and QS'. During the sampling interval when the output of shift register 102 applies a control signal (over a path hereinafter to be more fully described) to switches QS and QS', the output of speech amplifier A2 is applied over time division switch QS' to speech bus BUSIN. Simultaneously, the signal level then existing on speech bus BUSOUT is applied over time division switch contact QS to the input of port amplifier A1. If the status of the time division switching network is such that station port circuit 3 is in communications connection with line port circuit 7 (FIG. 7), switch S1 in line circuit 7 will be closed at the same instant of time as switch QS' in station circuit 3. Sample applied through switch QS of line circuit 7 is applied to the tip and ring conductors extending to the central office.

In addition to the foregoing functions each of the station port circuits must (a) provide talking current to the station set, (b) route audio signals from the station to the time division bus and vice versa, (c) provide a logic signal which represents the state of the station set switchhook. Station port circuits serving electronic key telephone sets, such as station port circuit 3 of FIG. 2 must, in addition, transmit data to and receive control data from the central controller for transmission over the data link to the electronic key telephone set. Station port circuits serving conventional telephone sets, such as port circuit 0 of FIG. 1 must absorb control data from central control and transmit control data to the central or main controller in such a manner that the central controller will not be aware of the number of different kinds of sets appearing in the switching network. Talking current is provided by resistor battery feed through the center tap of a line transformer relay SX with which each station port circuit is equpped. Station set loop current flowing through the winding of transformer relay SX operates enclosed reed contact SX1.

The line circuits shown in FIG. 7 interface the switching network with central office lines. Each line circuit performs the following functions (a) provides a CONTACT L1 to close the loop toward the central office for repeating dial pulsing, (b) couples audio signals between the time division bus and the central office line and (c) provides a logic level signal indicating the presence of conventional 20Hz ringing or the abandonment of the call by the central office end of the line circuit. Loop closure is accomplished advantageously by a mercury contact L1 of relay L. Ring detection is accomplished by the fluttering of the line transformer LX relay contacts LX1. Ring hold abandoned is detected by flip-flop RFF.

The supervisory state of the tip and ring conductors T,R of the station loop is monitored by a respective line transformer relay SX in the station port circuit of FIG. 1 serving a conventional no-button telephone set 101. Similarly, the port circuit serving each electronic key telephone set such as station circuit 3 in FIG. 2 includes a line transformer relay SX for monitoring the status of the station loop. The line transformers of both these circuits are each used to repeat loop status to whatever line circuit, FIG. 7, has been connected to the station circuit by means of the time division communications buses. As will be hereinafter explained in connection with the description of FIG. 5, the status of the station loop, once a time division connection has been established to a line circuit, is forwarded over a path that is independent of the main controller data communications buses DRO, 1; DSO, 1 as well as independent of the time division communications buses BUSIN, BUSOUT. The status of the station loop is reflected by the operated or released condition of contacts SX1 of the line transformer relay. When this contact is operated by closure of the station loop, ground potential is applied to lead HK and forwarded through inverter HKIV to the lower terminal of NAND gate DL. The signal is passed through NAND gate DL to conductor DL during the time slot assigned by the stationport circuit. The state of lead DL during each time slot is forwarded through the circuitry of FIG. 5 to lead LSHS to control the line relay flip-flop LFF, FIG. 7, in the line circuit which is connected to the station circuit during that same time slot.

Lead KH of the no-button station port circuit 0 of FIG. 1 exhibits the high signal state so long as no station set loop current flows through the left-hand winding of line transformer relay SX. The high signal condition on lead KH is inverted by gate HKIV whose output causes NAND gates SW and DL to apply the high signal state to leads SW and DL, respectively. The high signal on lead SW allows the time division port switches QS and QS′ to remain open-circuited. The high signal on lead DL is not meaningful at the present time. (The signal state on lead DL will be applied to gate 4 in FIG. 5 to indicate dial pulses when the station set is in the dialing condition.)

So long as the line transformer relay contact SX1 is open, the high signal resistance battery appearing on lead HK is applied to the center input of AND gate SUP1. In the absence of any change of state on lead HK, the $\overline{Q}$ output of one-shot circuit 166 maintains a high signal state on the upper input of AND gate SUP1.

Figure 3:
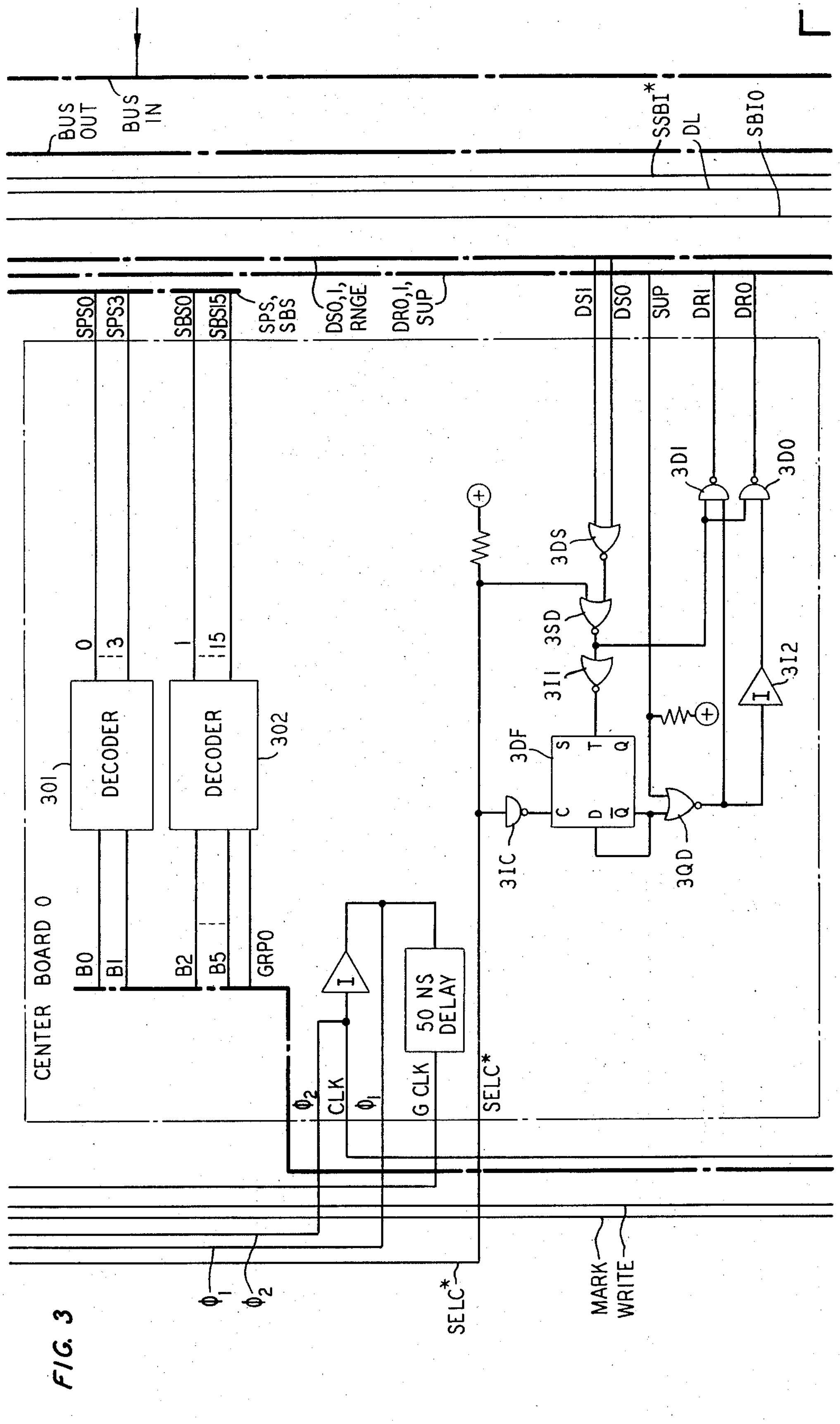
FIG. 3 shows inter alia the interface circuit for permitting conventional and electronic key telephone sets to return identical supervision signals to the main controller.

When no-button station circuit 0 of FIG. 1 is scanned by the main controller, enabling pulses are applied to leads SPSO and SBSO from decoders 301 and 302 of the centerboard circuit of FIG. 3. The signals appearing on these leads cause lead SEL to exhibit the high signal state. The high signal appearing on lead SEL is applied to the lower-most input of gate SUP1. With all of its inputs in the high signal state, gate SUP1 applies a high input signal to the upper input of NOR gate SUP. With a high signal applied to either of its inputs, NOR gate SUP applies a low signal at its output to supervisory bus SUP. The low signal applied to bus SUP is indicative of on-hook supervision and is returned to the centerboard logic in the lower portion of FIG. 3. As will hereinafter be explained more fully in connection with FIG. 3, the signal state on supervisory bus SUP is returned over leads DRO, 1 to the main controller during an appropriate pulse of the three-bit data sequence by means of which the main controller communicates both with port circuits serving no-button telephone sets as well as with port circuits serving electronic key sets.

When station 101, FIG. 1, goes off hook, a low signal is applied to lead HK. As will hereinafter be explained, the signal on supervisory bus SUP at the output of NOR gate SUP changes to the high signal condition after one-shot circuit 166 times out. At this point in circuit operation the delay in the supervisory state appearing on supervisory bus SUP incident to station set 101 going off hook is not significant. When station set 101 commences to dial, the continuity of the station loop through the primary of line transformer relay SX will be interrupted causing contact SX1 to release on each dial pulse. The dialing state will be repeated through inverter HKIV and gate DL to the dial bus DL. While it is desired that dial bus DL reflect the true supervisory state during dialing, it is not desired to cause the supervisory state on supervisory bus SUP to change each time a dial pulse occurs. As will hereinafter be more fully explained, it is also not desired to have the supervisory state of bus SUP change when contact SX1 flutters during ringing. The circuitry including delay gates A through D, NAND gates P and N and one-shot circuit 166 is provided to maintain the correct supervisory state on lead SUP.

Gates P and N are respectively actuated by positive and negative polarity transitional pulse on lead HK and, when actuated, deliver a negative going pulse of 40 nanoseconds duration to the triggering input of 100 millisecond one-shot circuit 166. Gates P AND N each include a transistor, not shown, the collectors of which are connectd together through resistance to battery. Gate P will operate to provide the negative going input pulse to the one-shot circuit when line transformer relay contact SX1 having been closed is released. Gate N produces the negative-going input pulse to one-shot circuit 166 when line transformer relay contact SX1 is operated. The duration of the negative-going pulse produced by gate P is determined by the cumulative delays in each of low power TTL logic gates A, B and C, while the delays of gates B, C and D determine the duration of the output from gate N. More particularly, when the potential on lead HK undergoes a positive excursion, the change is immediately applied to the upper input of gate P, but is applied to the lower input of gate P only after passing through the individual gate delays of gates A, B & C. On the other hand, the potential excursion on lead HK after appearing at the output of gate A is directly applied to the upper input of gate N, but is not applied to the low input of gate N until after passing through the cumulative delays of gates B, C, & D.

When, during a dial pulse, line transformer relay contact SX1 is released, lead HK goes high. Three gate delays later, the lower input of gate P receives the high signal and gate P applies a low signal input to the T terminal of one-shot circuit 166.

When one-shot circuit 166 is triggered, its $\overline{Q}$ output applies a 100-millisecond long low signal to the upper input of AND gate SUP1 causing the output of this gate to go low and to apply a low signal to the upper input of NOR gate SUP. In order that NOR gate SUP continue to provide the high signal condition to supervisory bus SUP, it is necessary for the lower input of NOR gate SUP to be provided with a low signal as well. Since it is assumed that the station is in the dialing condition, the ring control flip-flop RCFF comprising cross-connected NAND gates RNG and RNG* is assumed to be reset. Accordingly, ring control flip-flop provides a low signal to the center input of AND gate SUP2 causing its output, in turn, to apply a low signal to the lower input of NOR gate SUP. In summary, during the station loop open condition occasioned by a dial pulse, the triggered one-shot circuit 166 provides a low input through AND gate SUP1 to maintain a high signal condition on supervisory bus SUP at the output of NOR gate SUP. The 100-millisecond long low signal provided at the output of one-shot circuit 166 is sufficient to carry over the on-hook supervisory state between adjacent dial pulses. At the completion of dial pulsing, the low signal condition reappears on lead HK assuming that station set 101 remains off hook. 100 milliseconds after the completion of dialing, the low signal condition appearing on lead HK is applied to the center of input gate SUP1 and this signal becomes responsible for maintaining the correct supervisory state on supervisory bus SUP.

When the no-button station port circuit 0 of FIG. 1 is to apply a ringing signal to telephone set 101, the main controller sets ring control flip-flop RCFF. The manner in which the main controller applies signals to the conductor leads of bus DSO, 1 RNGE will be described hereinafter in connection with the three-bit data pulse sequence sent out over these control bus leads. Briefly, however, the main controller will apply a signal to lead DS1 to set flip-flop RCFF at the same time that a signal is applied to lead RNGE. The main controller resets the flip-flop RCFF by applying a signal to lead DSO and RNGE. With the ring control flip-flop RCFF set, the high signal at the output of gate RNG Is applied to an input of NAND gate RNGD. It will be assumed that station set 101 is on hook, that one-shot circuit 166 has not recently been triggered and that, accordingly, the left-hand input of NAND gate REL2 is in the low signal condition whereas the right-hand input is in the high signal condition. With one of its inputs in the low signal condition, the output gate REL2 provides a high signal output to the upper inputs of NAND gates RNGD and SUP2. Gate RNGD accordingly applies a low signal to the right-hand side of the winding of ring relay RNG, at whose transfer contact RNG1 superposed a.c. ringing is applied to the primary of transformer SX. On each cycle of ringing current, however, line relay transformer SX operates its contact SX1 which causes a low signal transition to appear on lead HK. It is not desired to have this low signal condition falsely indicate the off-hook supervisory state to the main controller as the main controller would then cause ringing to be tripped before the station user had answered. In order to prevent the false operation of line relay transformer SX2 from being reported to the main controller as an off-hook supervisory state, it is necessary to maintain the output of NOR gate SUP in the low signal condition indicative of an on-hook supervisory state.

Accordingly, when the line transformer relay contact SX1 operates on a cycle of ringing current, the low signal transition appearing on lead HK is inverted by delay gate A and is applied to the upper input of NAND gate N. Three gate delays later, the output of delay gate A will have traversed the serially connected delay gates B, C and D and will be applied as a positive signal to the lower input of NAND gate N. During the interval that the signal is traversing gates B, C and D NAND gate N has both of its inputs in the positive signal condition and applies at its output a negative trigger pulse to the T input of one-shot circuit 166. Output $\overline{Q}$ of one-shot circuit 166 will now be put into the low signal condition for an interval of 100 milliseconds. The low signal is applied to the right-hand input of NAND gate REL2 and to the upper input of AND gate SUP1. The low signal applied to the upper input of AND gate SUP1 causes a low signal to be applied to NOR gate SUP. This low signal, however, is not effective to produce the desired low signal at the output of this gate to report the maintenance of on-hook supervision to the main controller. The low signal condition at the right-hand input of NAND gate REL2, however, is effective to produce a high signal at the output of NAND gate REL2 to maintain the ringing relay RNG energized as well as maintain the output of AND gate SUP2 in the high signal condition. Accordingly, the low signal output of one-shot circuit 166 is effective through gates REL2 and SUP2 to maintain a high signal on the lower input of NOR gate SUP. With the high signal applied to its lower input, NOR gate SUP is effected to maintain a low signal indicative of on-hook supervision on supervisory lead SUP. The 100-millisecond duration of this signal is sufficient to carry over between cycles of a ringing current.

When the station user removes the handset from the switchhook of telephone 101 to answer the ringing phone, line transformer relay SX will operate its contact SX1 steadily. After one-shot circuit 166 times out, since no further transitions occur of lead HK, a high signal will be provided at the right-hand input of NAND gate REL2. The left-hand input of this gate receives a steady high signal from the output of gate A. Accordingly, NAND gate REL2 will apply a low signal to the upper input of NAND gate RNGD causing the output of this gate to go high and to release ringing relay RNG immediately retiring ringing. At the same time, the steady low signal condition on lead HK cuases AND gate SUP1 to provide a low input signal to the upper input of NOR input SUP. Gate REL2 applies a low input to the upper input of AND gate SUP2 which, in turn, applies a low input to the lower input of NOR input SUP. Since NOR gate SUP now has both of its inputs in the low signal condition, it applies a high signal state to supervisory lead SUP. The main controller presently receiving off-hook supervision in response to ringing will apply simultaneous pulses to leads RNGE and DSO to reset ring control flip-flop RCFF. However, the connection between gates REL2 and RNGD provides tripping of ringing within 100 milliseconds of station answer in the event that the main controller is otherwise occupied at the time off-hook supervision is applied to lead SUP. Accordingly, it is seen that the one-shot circuit and associated logic of the no-button station circuit prevent the temporary release of contact SX1 during dialing and the temporary operation of contact SX1 during bursts of ringing from indicating incorrect supervision to supervisory lead SUP.

DESCRIPTION OF CIRCUIT BOARD SERVICING CONVENTIONAL TELEPHONE SETS (FIG. 3)

Referring now to FIG. 3, there is shown a centerboard circuit for serving station port circuits. In the upper portion of the centerboard are decoders 301 and 302 for decoding the signals on leads BO through B5 that exhibit coded patterns of signals identifying the station number being accessed by the main controller through the interface register 500 in FIG. 5. Decoder 301 decodes the binary pattern on leads B0 and B1 to apply an output on one of the four leads SPS0 through SPS3. These "station port select leads" define four groups of station port circuits (FIGS. 1 and 2). Decoder 302 detects the pattern of signals on leads B2 through B5 to select one of the 16 output leads SBS0 through SBS15. The combination of an energized one of the SPS- and the SBS- leads results in the selection of one of the 64 station port circuits associated with the centerboard shown in FIG. 3.

In the lower portion of FIG. 3 is shown the circuitry that enables port circuits serving conventional telephone sets to report the switchhook status of their associated telephones to the main controller in the same manner as the port circuit associated with an electric key telephone set. The format used by the main controller for communicating with all port circuits is the same and comprises a 3-bit data sequence transmitted on leads DSO,1 to the port circuits from sequencer 1120 (FIG. 11) under direction of signals applied by the main controller to systems data bus 1299. Each bit of the data sequence applied to leads DSO,1 which compels the return of a response bit from the port circuit accessed by interface register 500.

Normally, the first bit of the 3-bit sequence is ring bit RA. The station port accessed by the appearance of its station number in interface register 500 receives ring bit RA and returns a dial status bit to sequencer 1120 over leads DRO,1. The transmission of ring bit RA by the sequencer to the accessed port circuit occurs during the station processing interval. Depending upon the distance between the accessed station port and sequencer 1120, the compelled response D bit applied by the accessed port circuit to leads DRO,1 may arrive at sequencer 1120 during or after the end of the station processing period.

The next bit of the data sequence transmitted by the sequencer is transmitted during the active line processing period. This bit is the second ring bit RB. In response to receiving ring bit RB, the station port returns the switchhook bit SH on leads DRO,1. The last bit of the 3-bit data sequence is transmitted during the button processing period. This bit is the lamp bit and in response to the lamp bit the station port returns a button bit on leads DR,1 which indicates whether or not the button being processed has been pushed.

The foregoing 3-bit data sequence is the normal mode of operation determined by the main controller because the majority of stations being serviced are expected to be of the electronic key button types. However, many installations will require that one or more conventional telephone sets also be serviced. In order that these sets may be properly served by the main controller, it is desirable to return switchhook status information from these sets in the same fashion as for the electronic key telephone sets. The main controller, however, normally also expects to receive the D bit on the DRO,1 bus prior to receiving the switchhook bit and also expects to receive the button bit after the switchhook bit. In accordance with an aspect of the illustrative embodiment, the circuitry in the lower portion of the centerboard enables a port circuit serving a conventional telephone set to report its switchhook status in the same manner as port circuits serving electronic key telephone sets.

When sequencer 1120 applies the first bit (ring bit RA) of the 3-bit data sequence to leads DSO,1, the signal takes the form of a 2-microsecond long high pulse applied to either of leads DSO,1. During the continuance of the high signal applied to either or both of leads DSO,1 the output of NOR gate 3DS, FIG. 3, exhibits a 2-microsecond long low signal condition. With the port circuit serving a conventional telephone set being selected by the station number in interface register 500, the low signal appearing on SELC* together with the 2-microsecond long low signal appearing at the output of NOR gate 3DS enables NOR gate 3SD to provide a 2-microsecond long high signal at its output.

During the continuance of this first 2-microsecond long high signal at the output of gate 3SD the upper inputs of NAND gates 3D1 and 3D0 are enabled. It will be noted that the lower inputs of NAND gates 3D0 and 3D1 are provided with opposite polarity signals from the output of NOR gate 3QD. (The lower input of gate 3D1 receives the output of NOR gate 3QD directly whereas the lower input of NAND gate 3D0 receives the output of NOR gate QD inverted by inverter 3I2.) Consequently, during the continuance of the first 2-microsecond pulse applied to leads 3DSO,1 one or the other of NAND gates 3D0 and 3D1 will apply a 2-microsecond long low signal to its respective one of leads DRO,1. Thus, the circuit in the lower half of the centerboard has caused a return pulse to be forwarded to the main controller in response to the first bit of the 3-bit data sequence transmitted by the main controller.

During the selection of a port circuit serving a conventional, no-button, telephone set, the high signal on the SEL lead of the circuit causes lead SELC* to exhibit a low signal condition. The low signal condition on lead SELC* is inverted by inverter 3IC and removes the clear signal to flip-flop 3DF. The high signal applied to the C input of the flip-flop primes the flip-flop and allows the flip-flop thereafter to be set when a positive-going toggle pulse is applied to its toggle input T. The positive-going toggle pulse will be provided to the T input via inverter 3I1 and gates 3SD and 3DS after the termination of the first pulse of the three-bit data sequence appearing on leads DS1 and DS0.

More particularly, the low signal condition appearing on lead SELC* during the selection of the port circuit serving the telephone set primes the upper input of NOR gate 3SD. When the first bit of the three-bit data sequence is applied to leads DS1 and DS0 by sequencer 1120, FIG. 11, the output of NOR gate 3DS exhibits a low signal condition.

During the first bit of the three-bit data sequence, the $\overline{Q}$ output of flip-flop 3DF, being high, forces the output of NOR gate 3QD to exhibit the low signal condition regardless of the state of the supervisory bus SUP. The low signal at the output of NOR gate 3QD is inverted by inverter 3I2 and applied as a high signal to gate 3D0. Since the upper input of gate 3D0 is also in the high signal condition, gate 3D0 applies a low pulse to be sent on lead DRO to sequencer 1120, FIG. 11.

In the illustrative embodiment the first signal pulse bit applied to leads DSO,1 may persist for an interval of 2 microseconds and will be separated from the onset of the next pulse on the same lead by at least 4 microseconds. With the termination of the pulse gate 3SD will apply a low-going signal to the input of inverter 3I1 which in turn will apply a high-going or toggling signal to the toggle input T of flip-flop 3DF. The toggling of flip-flop 3DF causes output $\overline{Q}$ to exhibit the low signal condition enabling NOR gate 3QD to reflect at its output a signal condition which is the inverse of the signal condition appearing on lead SUP. The signal appearing on lead SUP is supplied by the selected port circuit serving the conventional telephone set. Accordingly, at the end of the first pulse of the 3-bit data pulse sequence applied by sequencer 1120 to leads DSO,1 a compelled response pulse has been returned by the centerboard circuit to the sequencer and the centerboard has been primed by the setting of its flip-flop 3DF to reflect the condition of lead SUP.

The next bit of the data sequence transmitted by sequencer 1120 is ring bit RB in response to receiving ring bit RB. The centerboard associated with a selected no-button station circuit returns a switchhook bit SH on leads DRO,1 that reflects the switchhook state of the associated no-button telephone set. This switchhook information is made available to the centerboard circuit by the signal state appearing on lead SUP. The state of lead SUP is applied through gate 3QD to the lower inputs of NAND gates 3D0 and 3D1 to leads DRO,1 simultaneously with the arrival of the second pulse of the three-bit data sequence. More particularly, when the ring bit RB is applied as a 2-microsecond duration high signal to either of leads DSO,1, the output of gate 3DS exhibits a low signal which is applied to the lower input of gate 3SD. The upper input of gate 3SD is maintained in the low signal condition by lead SELC* so long as the port circuit under consideration is being considered. Gate 3SD being enabled by the low signal on lead SELC* applies a 2-microsecond long high signal to the upper inputs of gates 3D1 and 3D0. The lower inputs of these gates reflect the inverted signal condition appearing on lead SUP. Accordingly, gates 3D1 and 3D0 pass to return bus leads DR1 and DR0 the switchhook state of the associated no-button telephone set during the interval that ring bit RB is applied to leads DS0 and DS1.

With the termination of ring bit RB, a negative going pulse is applied by gate 3SD to inverter 3I1. The inverter applies another toggling input to flip-flop 3DF causing output $\overline{Q}$ to block gate 3QD. In the block state, the output of gate 3QD applies a low signal to NAND gate 3D1 forcing its output to be high when the third pulse of the three-bit data pulse sequence appears on lead DSO,1. Conversely, gate 3D0 will apply a low signal to gate DRO at this time.

Accordingly, the circuitry in the lower half of the centerboard causes leads DR1 to exhibit a high and lead DR0 to exhibit a low signal condition during the first and third pulses of the 3-bit data pulsing sequence and to exhibit signal conditions which are indicative of the switchhook state of the associated no-button port circuit during the second bit of the three-bit data pulse sequence.

DESCRIPTION OF MAIN CONTROLLER (FIG. 12)

The main controller of the present system defines four basic processing intervals, namely, station, active line, button and memory and network update. This processing arrangement differs in several respects from the processing arrangement employed in an earlier electronic key telephone system which is described in L. P. Fabiano, Jr. U.S. Pat. No. 3,637,939 issued Jan. 25, 1972. In the prior system, a single interval was allocated for data transmission between the central control unit and the line and station circuits. The data transmitted from the central control to the line and station circuits controlled, in the case of the station circuits, the application of ringing and the illumination of the key button lamps and, in the case of line circuits, the state of the line loop to the central office. Data returned to the central control included the switchook status and the identity of the operated key button at the station as well as the loop status of the line from the central office.

Figure 11:
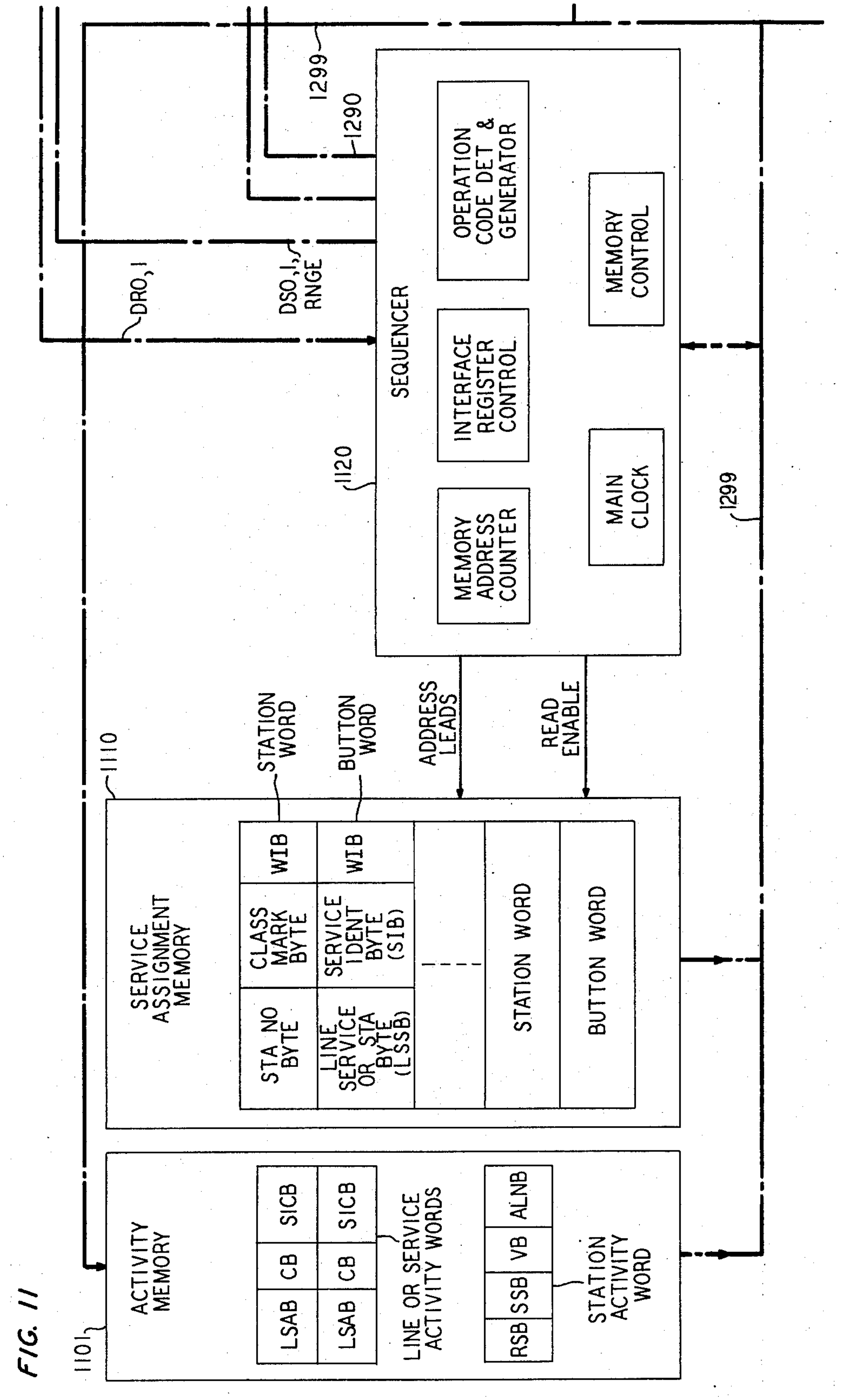
FIG. 11 shows the activity and service assignment memory units and the system sequencer.
Figure 12:
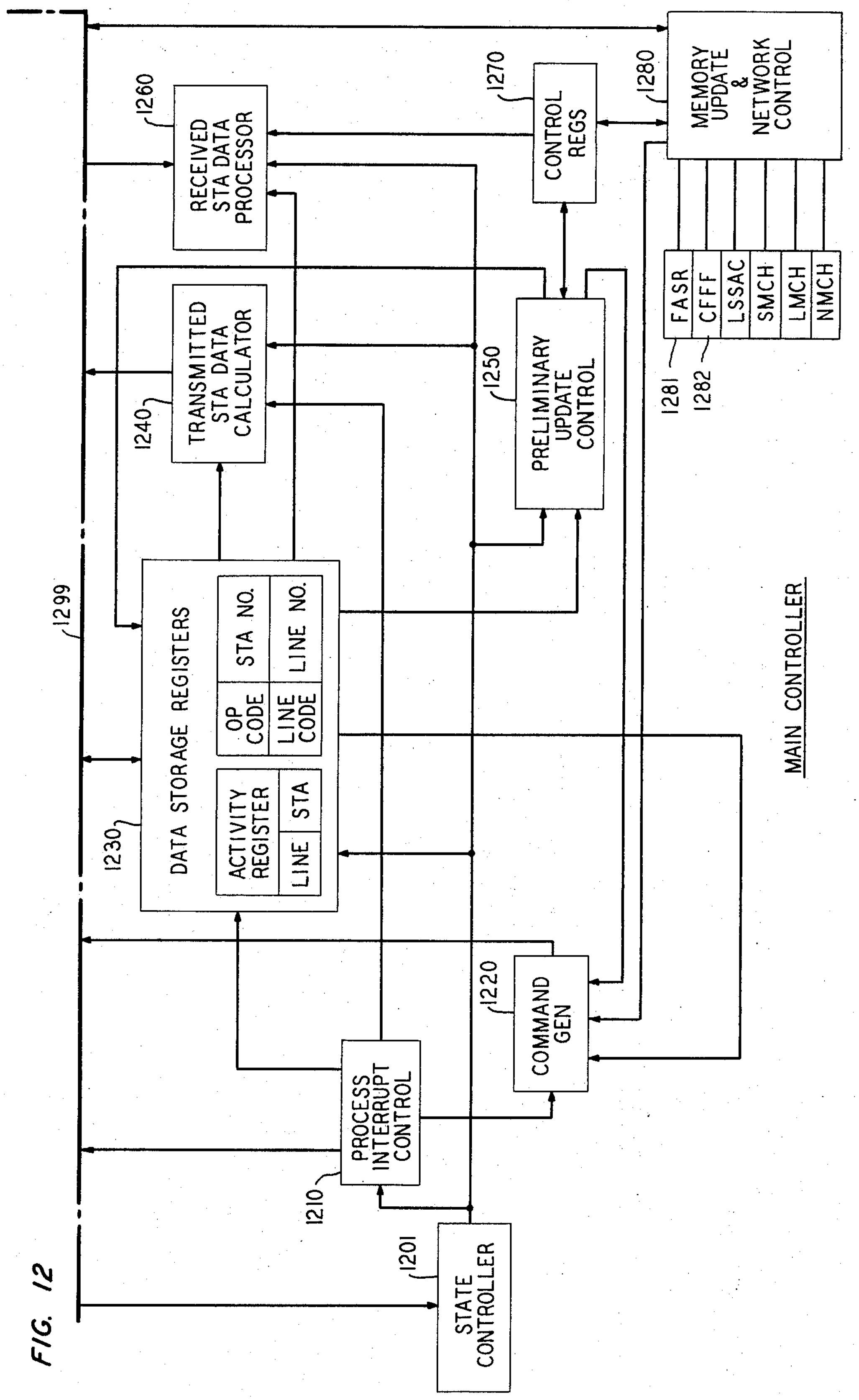
FIG. 12 shows the main controller.

In the present embodiment, data is transmitted between the sequencer 1120, FIG. 11, of the main controller, FIG. 12, and the station and line ports FIGS. 1 through 4 and 7 and 8 during each of three processing periods. Data is transmitted during station processing, during active line processing and during processing of the station's key button.

Figure 16:
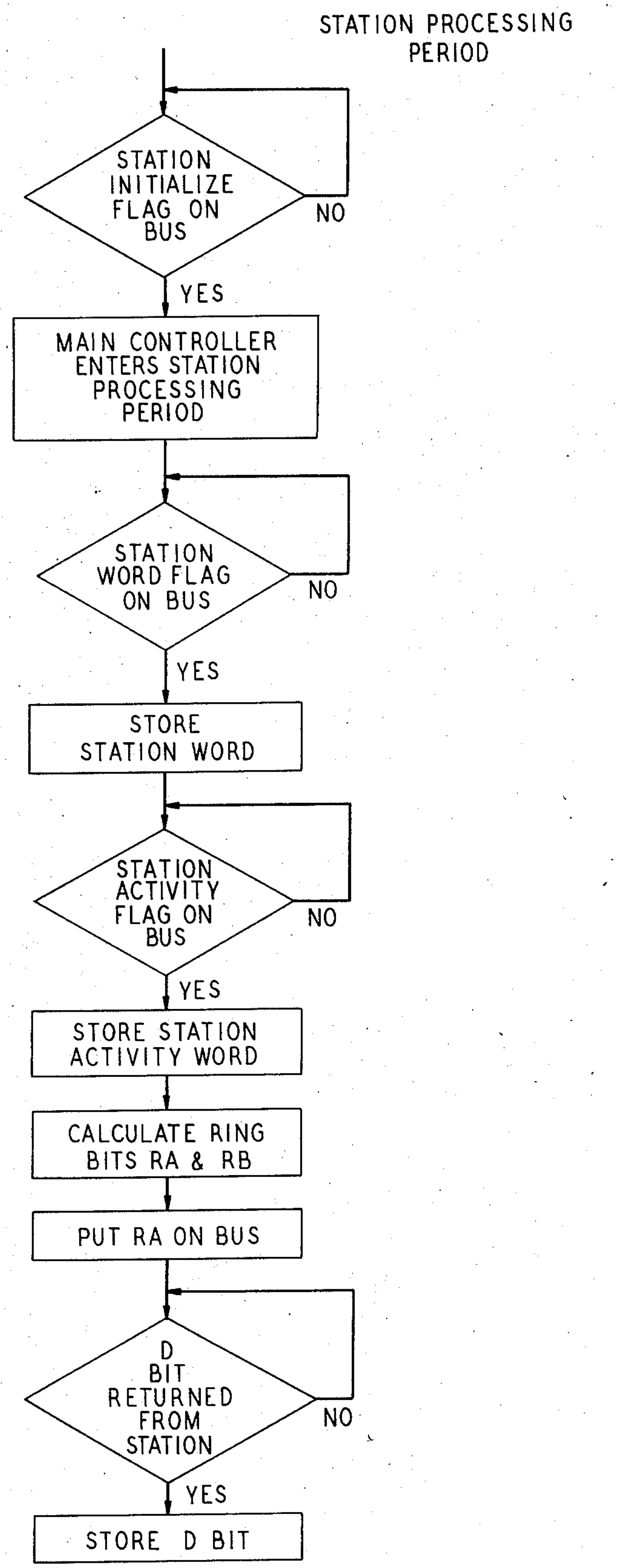
FIGS. 16, 16A, 17 17A, 18, and 18A show the logic flow and timing diagrams for the station, line and button processing periods.
Figure 16A:
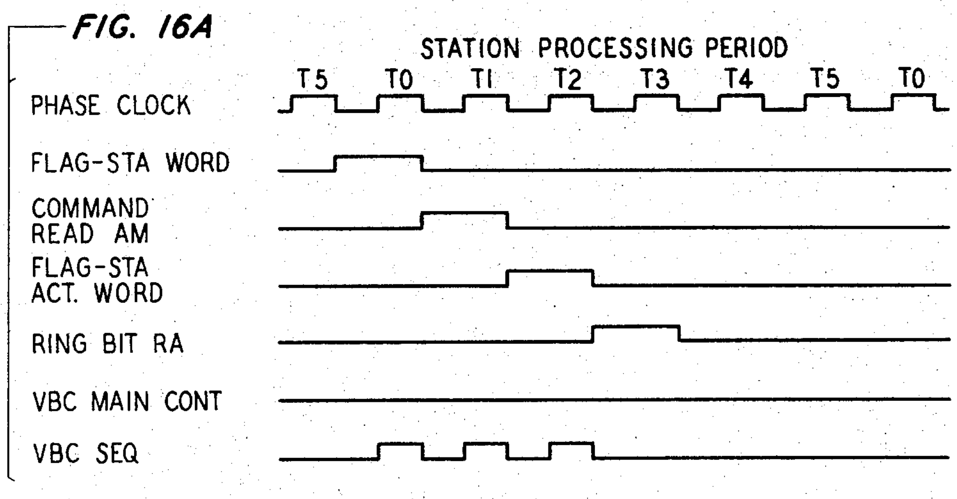

During the station processing period shown in flow diagram FIG. 16 and timing diagram FIG. 16A, data is first transmitted to the station ports when sequencer 1120 commands the service assignment memory 1110 to place a station translation word and the station activity word on the peripheral bus 1299 to the main controller, FIG. 12. The main controller functions at this time to detect this data on peripheral bus 1299 and to store it in data storage registers 1230. Using the stored information, particularly the ring status byte RSB of the station activity word, station data calculator 1240 in the main controller calculates a ring bit which is placed on peripheral bus 1299 to sequencer 1120. Sequencer 1120 accepts the ring bit and translates it into the appropriate format for transmission as ring bit RA over the appropriate leads of buses DSO,1 to the station port being processed. The station port receives the ring bit RA and returns a dial status bit D to the sequencer over the appropriate leads of bus DRO,1. Depending upon the distance between the station port and the sequencer-main controller, the D bit on the DRO,1 bus may be received during or after the end of the station processing period.

Figure 17:
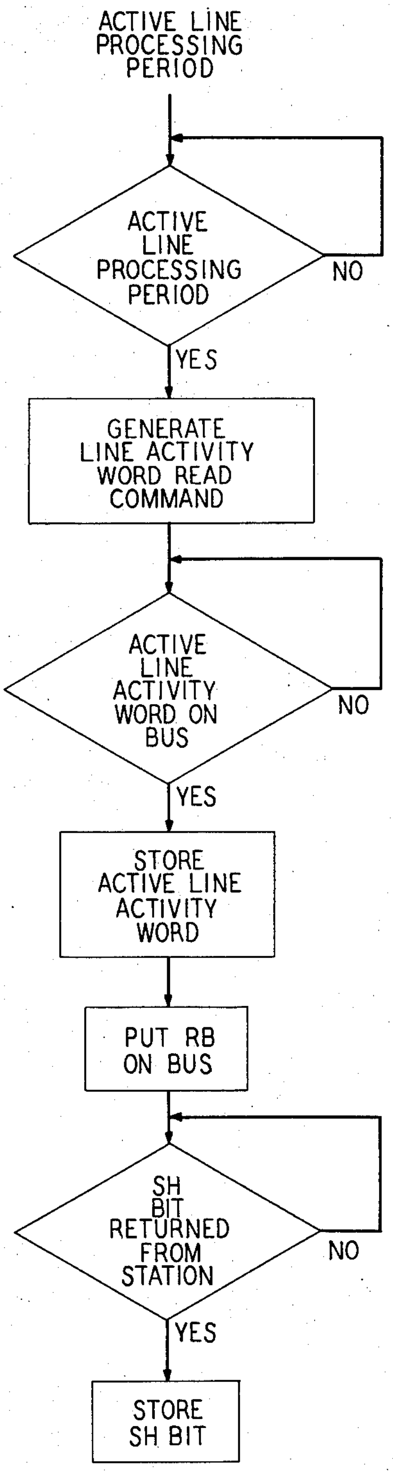
Figure 17A:
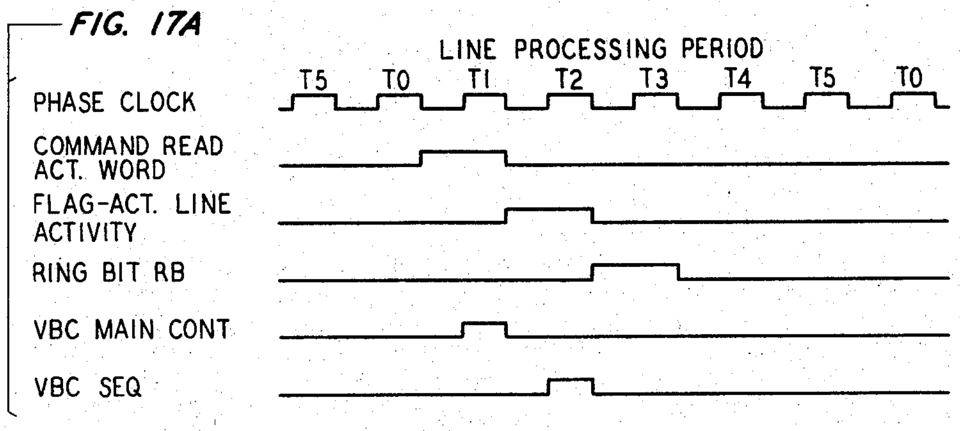

An active line processing period shown in flow diagram FIG. 17 and timing diagram FIG. 17A begins at phase TO following the station processing period at which time sequencer 1120 is directed to read the activity memory and to put the station's active line activity word on peripheral bus 1299. The word on this bus is then stored in main controller data storage registers 1230. The main controller then puts the second ring bit RB on the bus. In response to receiving ring bit RB the station returns the switchhook bit SH on the DRO,1 bus. As was the case with the dial status bit D, the switchhook bit SH may be received by the main controller during the same processing period or somewhat later.

Figure 18:
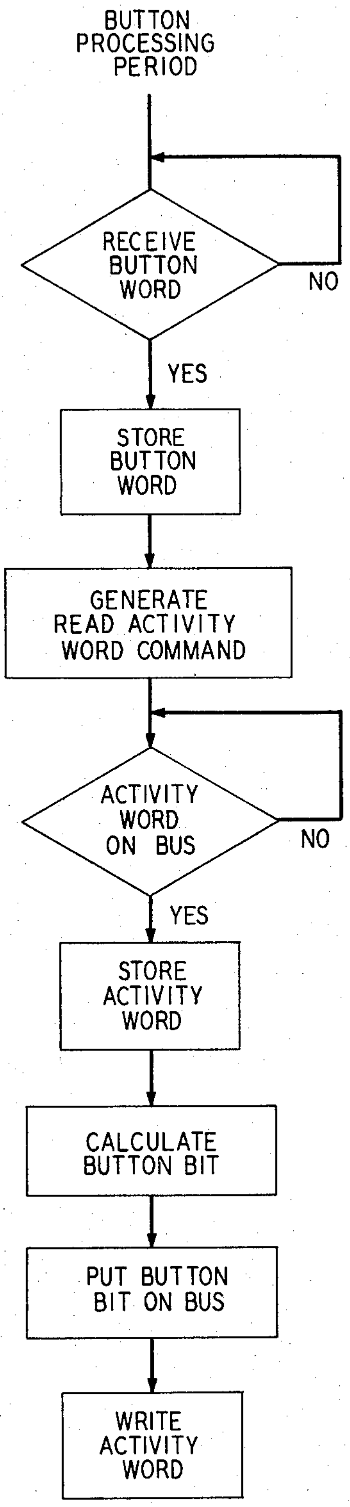
Figure 18A:
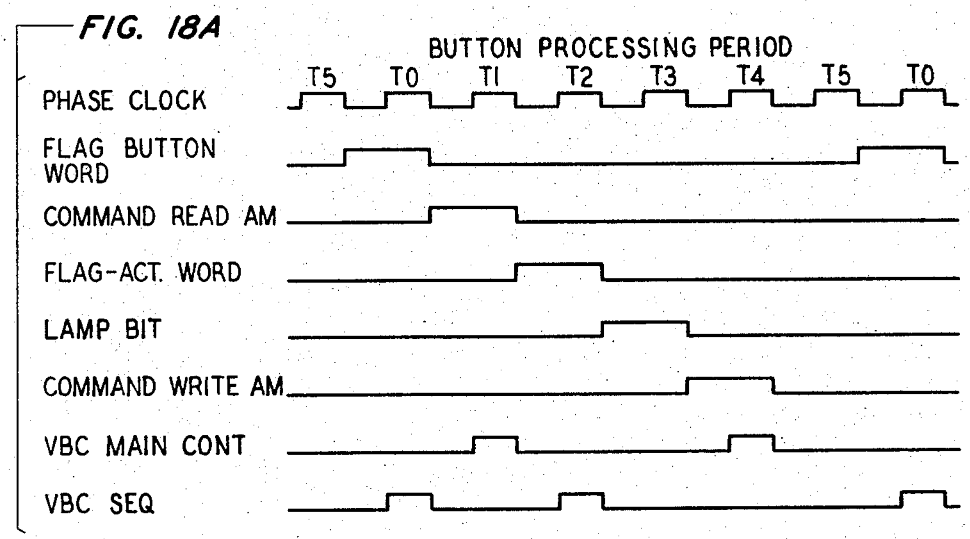
Figure 19:
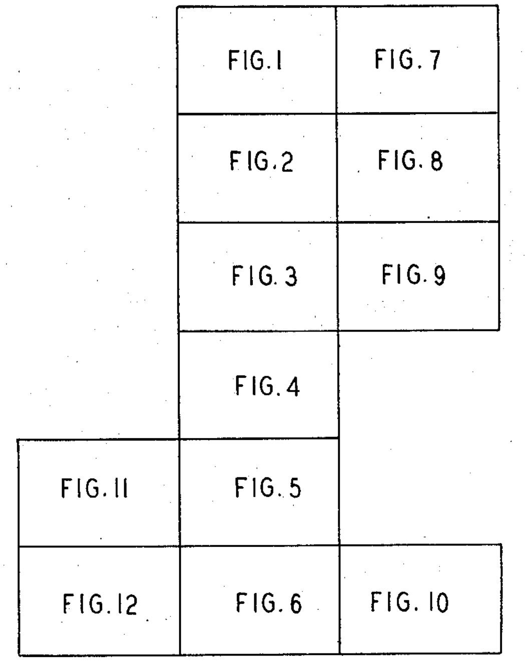
FIG. 19 shows how

Each button on a station set is processed during a six-phase processing period shown in flow diagram FIG. 18 and timing diagram FIG. 18A. The length of the button processing period for a particular set is therefore a variable determined by the number of active buttons with which the station set is equipped. At the beginning of each button's processing period sequencer 1120, FIG. 11, causes the service assignment word for the button such as button word 1112 to be transferred from memory 1110 of the main controller, FIG. 12. The main controller then determines from the service identifier byte the service assigned to the button and generates a command to read the appropriate one of activity memory words for the line or service in activity memory 1101 FIG. 11, and to store that activity word in data storage registers 1230. Transmitted station data calculator 1240 uses the priorly stored service assignment byte and activity word for the station together with the button's service assignment and activity words and calculates the lamp bit for the button. The lamp bit is transmitted to the station which responds over the DRO,1 bus with a button bit indicating whether or not the button being processed has been pushed. Again, depending on the distance from the station circuit to the main controller, the button bit may not be received until after this button's processing period. This process is carried out for each programmed button on the station set.

After a station's last button has been processed, sequencer 1120 scans data bus 1299 to see if any units have indicated a change of state during the button processing period. The sequencer enables each of these units in turn to process its changes. When the main controller FIG. 12 is enabled by the sequencer, it enters its memory update and network control processing period. During this time, the main controller generates commands to change connections in the network and to update the station line and service activity memories. When the main controller has finished its tasks, it generates an exit command and then waits until the processing of the next station begins.

DESCRIPTION OF THE ACTIVITY MEMORY, SERVICE ASSIGNMENT MEMORY AND SEQUENCER (FIG. 11)

Two types of memory units are employed in the present embodiment. A service assignment memory 1101 is used to translate the messages received from a station set into specific service requests. The activity memory 1101 is used to store the current activity of lines, stations, and services in the system. This activity information is determined by detecting incoming calls for lines and state changes received from the stations. The information stored in the service assignment memory is combined with current activity information stored in the activity memory to generate the lamp and ring messages that are transmitted to the stations. The call processing operations are performed by the main controller, FIG. 12, in conjunction with the sequencer 1120 of FIG. 11. The sequencer is organized to sequentially scan each station and each of its assigned buttons. Each station is scanned at the 25-millisecond rate to detect dialing states and for ringer control and at a 50-millisecond rate for detection of the button and switchhook states and for control of its key button lamps.

Service assignment memory 1110 is a reprogrammable memory which advantageously operates in a read-only mode to identify and to assign services to stations. Advantageously an insulated gate field effect transistor element may be employed. Service assignment memory 1110 is organized with a single word for each station, the so-called station word and with a respective word, the button word, for each button assigned on a particular station set. A station is associated with a particular group of words in service assignment memory 1110. A group consists of a station word which identifies the station and a number of button words which define the services assigned to each button. The exact number of the button words for each station depends on the number of buttons on the station set which are to be assigned services accessible to the station set user. Every button on a station up to and including the last assigned button will have a corresponding button word. For example, a six-button station set having its first three buttons assigned to different services will have three button words in the word group assigned that station in the service assignment memory. A rearrangement of the assignment of these buttons so that the first two services would be accessible to the first two station set buttons with the remaining service assigned to the fifth station set button would require the assignment of five button words for the station in service assignment memory 1110. The two unassigned buttons between the second and fifth station set buttons would be programmed as blank buttons in memory 1110.

As shown in FIG. 11, the station and button words are identified by means of a bit termed the word identifier byte. The identifier byte WIB is set to 0 for station words and to 1 for button words. Two additional bytes are contained in each station and button word. The station word contains a 6-bit station class mark byte which is used to assign services that do not require special service buttons and can usually be applied to any of a station's lines. These types of services are station-oriented services and constitute a class of service for the station. For example, if the key system is to be equipped with automatic pick-up service that can apply to any of the stations' line appearance, this service will be assigned to the station by means of its station class mark byte.

The station word also contains a station number byte. This number is an equipment number that represents the location of the port at which the station's cable is terminated on the equipment rack. The station number is a 9-bit binary number and accordingly may identify one out of 512 possible stations.

The button word contains the single bit word identifier byte, the service identifier byte SIB and a line service or station byte LSSB. The service identifier byte identifies the service assigned to the button. The line service or station byte is a 9-bit number which may serve as a line number when the button is assigned to access a line in which case the 9-bit code may identify one out of 512 possible lines. The line number in the LSSB of the button word is also used to access the correct location in activity memory 1101 in which the activity of the line is stored. The LSSB may also be used to store the number of the equipment port at which central office, direct lines or off-premises intercom lines may be terminated. The LSSB of a button word may also be used to identify line applied services such as hold, exclusive, and conferencing. A particular line applied service is identified by means of coding within the LSSB of the button word for the service.

Activity memory 1101 is advantageously a random access read-write IGFET memory and may contain 512 36-bit words. The activity memory is divided into a station section and a service section. Each word in the station section stores one station's activity while the current activity of a line or service is stored in the service section.

A particular station activity word is addressed using the station's corresponding station number from service assignment memory 1110. Each station word in the station section activity memory 1101 comprises an active line number byte ALNB (9 bits), a ring status byte RSB (2 bits), a switchhook status byte SSB (3 bits) and a verified byte VB containing 2 bits. The ALNB byte stores the line number to which the station is or will be connected by the switching network when the station is in the off-hook state. The ALNB normally has a line number stored in it regardless of whether the station is on or off hook. When the station is on hook and has not preselected a line, the ALNB of its station activity word corresponds to the station's prime line, ringing line or last off-hook line. Preselecting a line button causes that button's line number to be stored in the ALNB. The RSB byte indicates the ringing state of the station. These bits are periodically updated and are used to control the ringer at the station. The two-bit RSB may be coded to provide 10 or 20 Hz ringing or other ringer state control signals.

The verified byte VB and switchhook status byte SSB may be used to verify button and switchhook changes that occur in a station. A change may be required to be received from a station during two consecutive processing scans of the station before the change is processed as a verified change. The two-bit VB may be coded to represent a released button state, an unverified button state change, a verified button state change or an unverified button release. The verified byte is in the released state when no buttons are being pushed. The first time that a station is processed and a button-being-pushed state is detected, the verified byte is set to the unverified change state. The next time the station is scanned and the station is detected as having pressed the button, the VB is set to the verified change state and the service request is processed. The VB is returned to the released state when the station set user releases the button and the release is verified.

The switchhook status byte SSB is coded to verify the off-hook state. The three bits of the SSB may be coded to represent the on-hook state (111), an on-hook preselected state (110), an off-hook unverified or not connected state (101) and an off-hook verified and connected state (100). A station which is on-hook will have its corresponding SSB set to the on-hook state. The SSB may be updated to the on-hook preselected state if a line button is preselected to override automatic pick-up service. The first time a station is processed and an off-hook state is detected, the corresponding SSB is set to the off-hook unverified state. The next time the off-hook station is processed for switchhook and button changes (50 milliseconds later), the off-hook state is verified and an attempt is made to connect the station to the line corresponding to the line number stored in the ALNB.

The off-hook unverified or not connected state may also be utilized when the main controller is busy performing another task which prevents it from immediately connecting the station to the line indicated by the number in the ALNB. To defer the new connection until the main controller is available, the SSB may be left in the off-hook unverified or not connected state. The main controller will then "try again" the next time the station involved in the connection is processed. The SSB may also be caused to be in the off-hook unverified or not connected state when all time slots of the time division voice network are busy. The three-bit SSB may be also used to verify and time the on-hook state of the station. Three-bit codes may be assigned to represent the on-hook unverified state (011); the on-hook verified, not connected state (010); on-hook first count (001) and on-hook second count (000). The SSB is updated from the off-hook verified and connected state (100) to the on-hook unverified state (011) when an on-hook condition is detected for the station. The on-hook condition is updated to a verified state (010) and the station is disconnected after two successive scans 50 milliseconds apart reveal that the station is still on-hook. Once the on-hook verified and not connected state (010) is reached, a counting sequence is started. This counting sequence may use a 2-second clock to increment the SSB from the verified on-hook not connected state (010) to the on-hook state (111). The just-described counting sequence is principally useful in connection with performing dial tone recall. Dial tone recall service permits a station user to depress his switchhook to recall dial tone on his active line. If the station user depresses the switchhook for less than 4 seconds, the station will be reconnected to its active line. If the switchhook is depressed for greater than 4–6 seconds, the station's active line may change to its prime line or first ringing line. These lines may be automatically selected as the station's active line when prime line or ringing line preference service is assigned to the station in the class mark bytefor the station word in service assignment memory 1110.

As mentioned previously, the service section of the activity memory stores the current activity of the lines. This section is addressed by the LSSB obtained from the service assignment memory. A word in the service section of the activity memory consists of three bytes: a line or service activity byte LSAB, a count byte CB, and a station in control byte SICB. The LSAB consists of five bits and is used to represent the particular activity of a line or service. The count byte CB consists of three bits and may be used to perform counting functions involved with a particular service, for example, timing for hold abandon or to verify ringing detection. The 9-bit SICB is provided so that a station which places a line on hold may receive a unique lamp indication on the hold line appearance button. The SICB of the held line's activity word is used to hold the station number of the station placing this line on hold.

The activity of a line is updated to busy when a station originates a call on the line. The station number of the originating station is written into the SICB at this time. The activity of a line is cleared to idle when all stations using the line hang up. Line clearing may be performed by means of a repetitive, three-cycle operation involving the CB. Each cycle involves one complete 50-millisecond scan of all the stations and buttons. The CB of all active lines are set to a particular count code during a first of the three cycles. The CB of a line which has at least one station off-hook and connected to it is incremented during the second cycle. During the third cycle, the activity byte, CB and SICB of all lines which continue to have the first count written in the CB are cleared to the idle state. This manner of clearing lines is analogous to the manner of clearing lines described in the above-mentioned Fabiano U.S. Pat. No. 3,637,939.

DESCRIPTION OF THE NETWORK CONTROLLER (FIGS. 6 AND 10)

Figure 6:
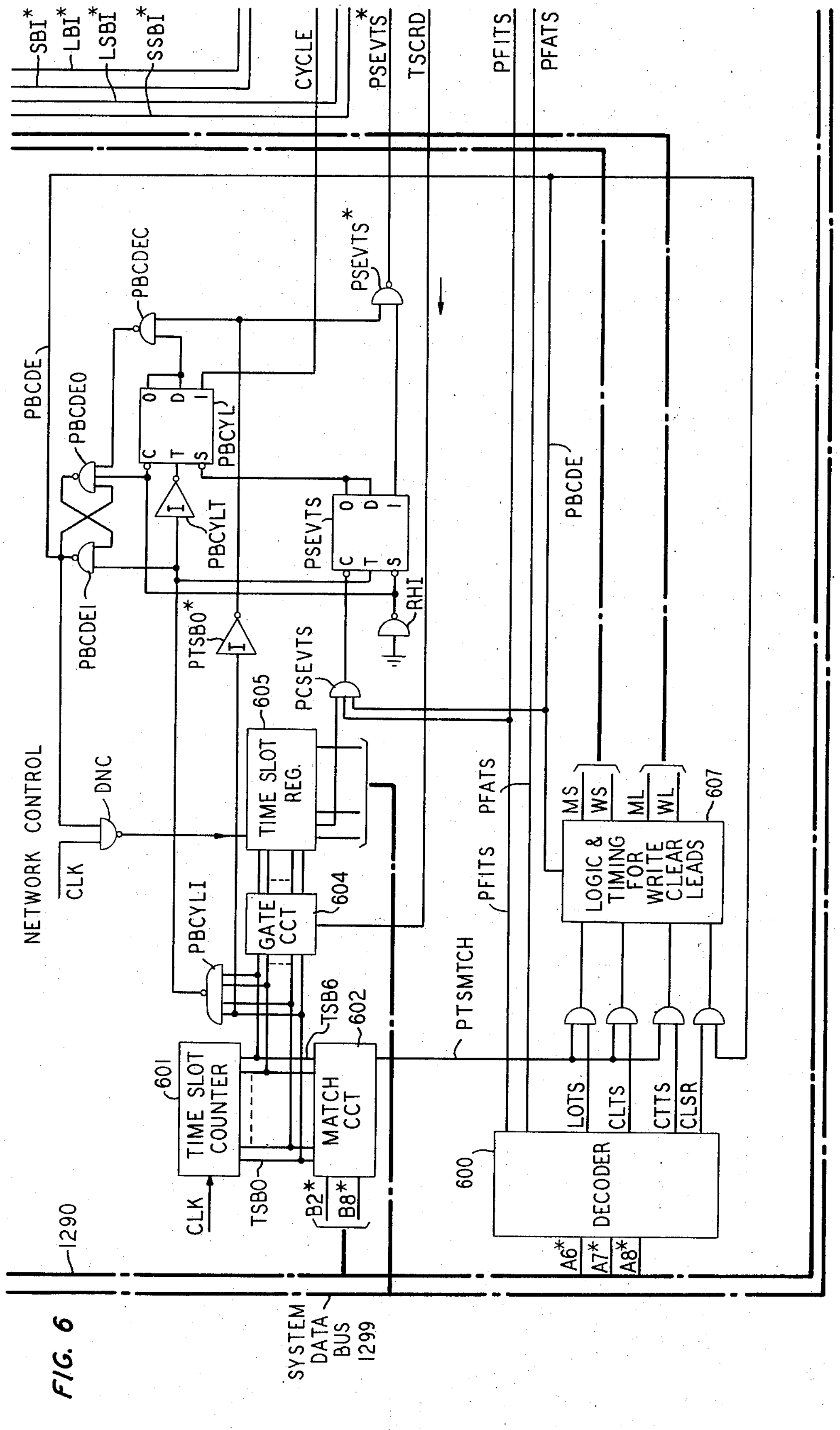
FIGS. 6 and 10 show the network control and a portion of the audit logic of the illustrative key telephone system.
Figure 10:
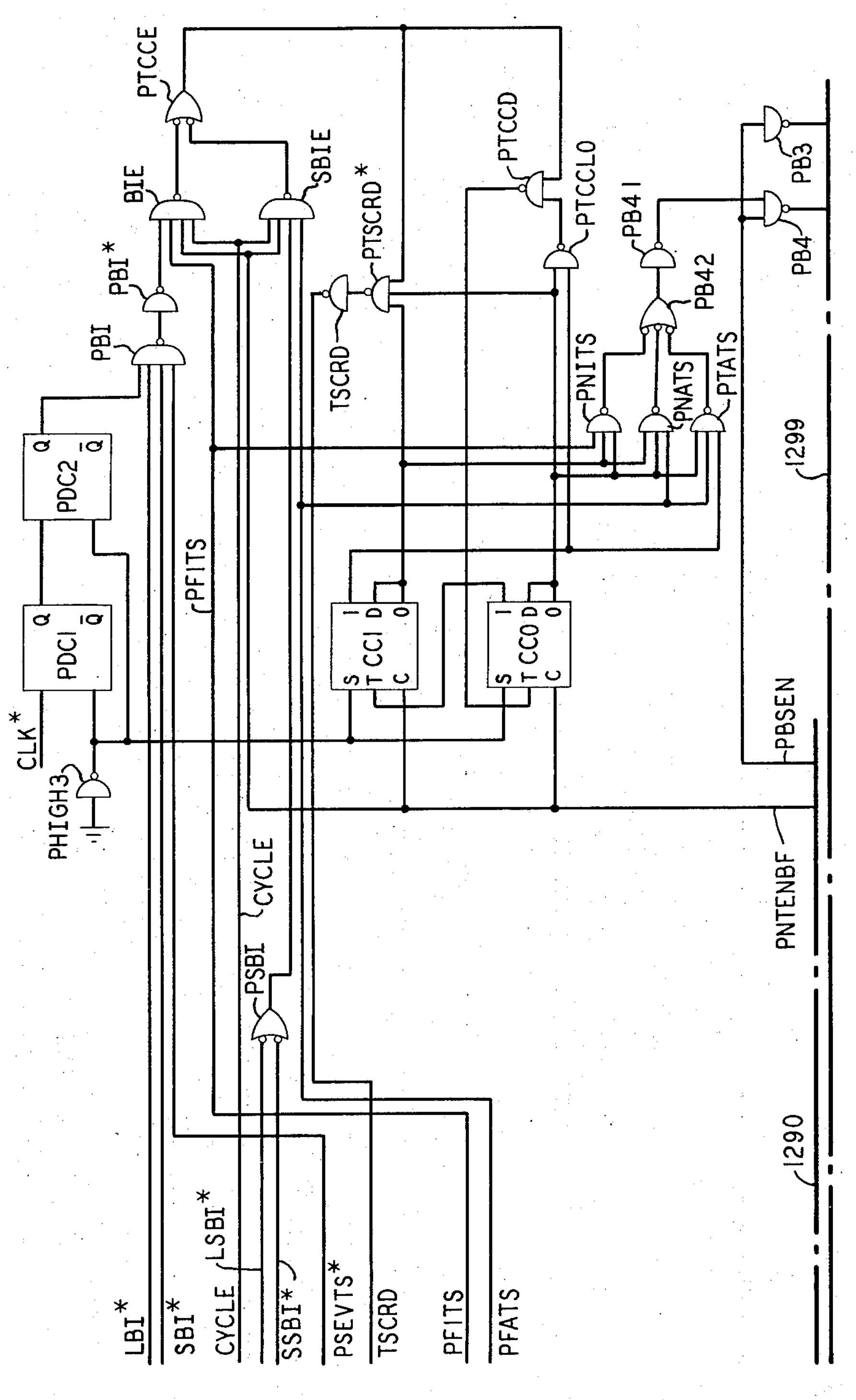

The network control circuitry shown in FIGS. 6 and 10 contains the logic necessary to accept commands from the main controller FIG. 12 and sequencer 1120, FIG. 11, so that specific ports may be connected to or disconnected from the communications bus, so that idle time slots may be identified, and so that the existence of specific connections can be verified in the network. A record of the busy/idle state of network ports is, as mentioned previously, kept in activity memory 1101 in FIG. 11 which is divided into two sections, a station activity section and a line or service activity section. Each word in the line or service activity section stores the current activity of a line (or service) and the number of the station controlling that line or service, i.e., the number of the station to which the line is connected. The line activity word shows that a line is idle when the line activity code (stored in the LSAB), of the word is all 1's. The activity word for a line is addressed using the LSSB of the line's corresponding button word obtained from service assignment memory 1110.

When the network controller is employed by the main controller to establish or to disconnect a port circuit connection to the time division communication bus, the main controller, via sequencer 1120 and cable 1290, furnishes a time slot number to match register 602 and applies a time slot writing or clearing command to decoder 600. The main controller desires that the writing or clearing take place in the port circuit shift register during the time slot identified by the 7-bit time slot number entered into match circuit 602. The clock driving time slot counter 601 in the network controller and the clock driving the port circuit shift registers such as port shift registers 102 of station circuit 3, FIG. 2, are in synchronism.

The function of match circuit 602 in the network controller is to match the time slot number furnished it by the main controller against the count accruing in time slot counter 601 and then to generate signals to load or clear port circuit shift registers. The match signal which circuit 602 provides on lead PTSMTCH can only occur at exactly the proper time slot count. It is, however, a characteristic of certain shift registers, including the ones utilizing in the port circuits of the present embodiment, that a write or clear control command must be present just before the clock signal arrives. It is therefore not possible for the match signal to be generated by circuit 602 before the port circuit shift register receives the clock signal. In this manner though the port circuit shift registers and time slot counter 601 receive the same clock signal, the port circuit shift registers cannot be loaded on the same clock pulse that generates the match signal on lead PTSMTCH and so must be loaded or cleared one time slot later than the actual time slot count number appearing in match circuit 602.

This discrepancy between the time slot count in match circuit 602 and that in the port circuit shift registers does not, of course, affect the accuracy of communications connections established in the time division switching network and does not cause any difficulty because neither activity memory 1101 nor the main controller, FIG. 12, keeps any record of the actual time slot number during which active stations and lines are interconnected by the time division communications bus. Since no time slot assignment memory need be provided, the size of activity memory 1101 need not be as great as in conventional time division switching systems. However, it is necessary from time to time for the main controller to find which time slots on the time division bus are idle so that an idle time slot can be selected to establish a connection between a line and station. Having determined the number of an idle time slot, the main controller must then furnish this number to the network controller so that a bit identifying the time slot may be loaded into the port circuit shaft register of the line and of the station circuit between which interconnections are to be established. It is of course essential that the correct time slot be loaded.

When the main controller has obtained the number of an idle time slot from the network it instructs the network that this time slot number shall be seized for use to establish a time division network connection between the particular line and station by furnishing the time slot number to match circuit 602 of the network controller. It would of course be possible for match circuit 602 to be equipped with a down counter to immediately reduce by one the time slot number furnished it by the main controller so that the port circuits would be accessed early enough to permit the write or clear control command to be present before the correct clock signal arrived. Providing the match circuit with a down counting arrangement, however, involves the furnishing of a considerable amount of additional circuitry, making the match circuit unnecessarily expensive. In the illustrative embodiment, therefore, the match circuit 602 is not provided with a down counter and time slots are loaded into the port circuit shift registers one time slot count later than the actual time slot count furnished by the main controller. However, to compensate for the discrepancy between the time slot count of the actual network connection and the time slot count dictated by the main controller, a down counting arrangement is provided in the network controller as part of a mechanism which reports to the main controller the count accruing in the network when the network is interrogated. It is thus possible to compensate for the discrepancies in time slot counts without adding any great amount of circuitry to that otherwise required merely for reporting the existence of idle or active time slots themselves.

Assuming that when the network in interrogated the time slot count accruing in counter 601 is entered into time slot register 605 in parallel, the contents of register 605 may conveniently be down-counted when gate DNC is enabled. The internal circuitry necessary to make register 605 downcount may be implemented in any of several well known manners. For example, register 605 may include a number of stages each having a D-toggle flip-flop. Each stage is normally set at the start of a cycle. The stages are selectively individually reset in accordance with the particular count furnished from time slot counter 601. Down-counting may conveniently be provided by permitting a clock pulse to toggle the least significant stage of the register at the end of the cycle during which a time slot count would be entered into register 605. Gate DNC provides this down-counting enabling input to register 605 at the end of the cycle prior to register 605 furnishing its contents to the main controller.

Assuming that all of the flip-flops defining the stages of register 605 were set to 0 and the least significant (first) stage was toggled by the output of gate DNC, the output of the first stage would go high and toggle the next stage which in turn would toggle its succeeding stage and so on. Accordingly, the output of gate DNC would toggle register 605 to the all-1's state. If register 605 had had all of its stages initially set to the all-1s condition and the output of gate DNC provided a toggle, the least significant stage of register 605 would be switched to the 0 state. The toggling of the first stage of the register under these circumstances would not be repeated throughout succeeding stages inasmuch as its output going from the 1 to the 0 state would not be effective to toggle the second stage. This, however, is exactly what is desired since the time slot count number that is one less than the binary all-1s state is a state in which all except the least significant stage of register 605 is set to binary 1.

FINDING IDLE TIME SLOTS

When the main controller desires to establish a network connection, it must first determine whether an idle time slot exists during which the connection can be set up. To do so, command generator 1220 in the main controller places a find-idle-time-slot command on system data bus 1299 which is applied through sequencer 1120 to cable 1290 and received in decoder 600 of the network control. Responsive thereto decoder 600 energizes lead PFITS. The energization of lead PFITS primes gate BIE in FIG. 10. Gate BIE monitors the station busy/idle bus SBI* and the line busy/idle bus LBI* during the active interval of the time slot. The active interval of the time slot is defined by one-shot circuits PDC1 and PDC2 which provide 200 and 100 nanosecond delays, respectively, from the onset of the clock pulses. The state of busy/idle buses SBI* and LBI* is reported to gate PBI together with the control signal on lead PSEVTS*. (The control signal on lead PSEVTS* will be described hereinafter.) The output of gate PBI inverted by gate PBI* is applied to the upper-most input of gate BIE. If all of the inputs of gate PBI are high during a particular clock pulse, gate PBI produces a low signal at its output to indicate that the time slot occurring on that particular clock pulse is an idle time slot. Gate PBI* inverts the low signal and applies a high signal to the upper-most input of gate BIE.

As noted previously, the station and line busy/idle buses SBI* and LBI* exhibit a low signal condition during the active interval of a time slot that any port circuit is caused by its port circuit shift register to be connected to the time division communications bus. To provide a degree of protection against a circuit permanently maintaining its busy/idle bus in the low signal condition, the time slot is provided with a guard interval. Thus, while the port circuit shift register is permitted to apply a low signal to the busy/idle bus during the active portion of the time slot, it is prevented from doing so, when properly operating, during the guard interval of the time slot.

In FIG. 10 the circuitry at the input of gate BIE is provided for monitoring the signal state of the station busy/idle bus SBI* and of the line bush/idle bus LBI*. Delay gate PDC1 receives the time slot defining clock pulses appearing on lead CLK*. The delay of gate PDC1 is adjusted so that its output Q produces a high signal condition at the moment (illustratively 0.2 microsecond) after the onset of the time slot when a low signal condition, considering the round trip delays from the main controller to the port circuits, could be applied by a port circuit to its associated busy/idle bus and for the busy idle signal to appear at the circuitry of FIG. 10. The high signal at the output of delay gate PDC1 triggers one-shot circuit PDC2 to produce a high signal at its Q output which persists only for a portion (illustratively 100 nanoseconds) of the active interval (illustratively 200 nanoseconds) of the time slot. Thus, gate PBI is enabled only during the active interval of the time slot to monitor the state of busy/idle buses LBI* and SBI*.

Selecting Even Time Slots

Time slot counter 601 in FIG. 6 counts the clock pulses applied to it on lead CLK. These pulses are in synchronism with the clock signals that advance the line and station port circuit shift registers (see FIGS. 1, 2, and 7) to define the intervals during which the port circuits may be connected to the time division communication bus. Assuming that the system is being set into operation for the first time, all time slots may be assumed to be idle. While any practical time division switching system will be constructed in accordance with sound engineering practices so as to reduce crosstalk between adjacent time slots, it is possible in accordance with one aspect of the illustrative embodiment to provide an even further margin against crosstalk when the time slots are relatively lightly loaded. In accordance with this aspect of system operation, the network control will initially assign only even numbered idle time slots for connections until all even-numbered time slots have been assigned. During this phase of system operation, there will be one unused time slot acting as an additional guard interval between each active connection thereby providing an additional degree of crosstalk protection.

To achieve the assignment of initial connections to even numbered idle time slots, the circuitry in FIG. 10 which is responsible for detecting idle time slots in the time division communications network is prevented from detecting any idle odd-numbered time slots during the scanning of a first cycle of time slots in the following manner.

The time slots governing the intervals during which time division connections may be established in the switching network are counted by time slot counter 601. Incident to the end of a cycle of time slot counting, counter 601 will produce an all-1'output activating gate PBCYLI. The activation of this gate produces a low signal which toggles flip-flop PBCYL via inverter PBCYLT and prevents the toggling of flip-flop PSEVTS until the beginning of a new cycle of time slot counting. At the beginning of a new cycle of counting the output of gate PBCYLI goes high and toggles flip-flop PSEVTS. When flip-flop PSEVTS is toggled to the set state only those time slots found to be idle in the network and which are even-numbered will be selected for assignment to new connections. The set state of the select-only-even-time-slots flip-flop PSEVTS together with a high signal from inverter PTSBO* enable gate PSEVTS to apply a low signal on gate PSEVTS*. The low signal on lead PSEVTS* forces gate PBI to indicate that the time slot then accruing is busy even if in fact the time slot were actually idle. Inverter PTSBO* produces a high signal at its output whenever its input which is connected to the least significant digit output lead of time slot counter 601 is in the low signal condition indicating the occurrence of an odd-numbered time slot.

Flip-flop PSEVTS is cleared by the application of a low signal to its C input. The continuous high signal applied to the S input of flip-flop PSEVTS by gate RHI has no effect, the connection to gate RHI being merely to eliminate noise. Whenever any of the inputs to AND gate PCSEVTS exhibits the low signal condition, the output of gate PCSEVTS goes low and clears flip-flop PSEVTS. Whenever the least-significant digit entered into register 605 is a 0 and whenever the cycle flip-flop PBCYL is reset, flip-flop PSEVTS will be reset.

When an idle time slot is found, the circuitry of FIG. 10, as will hereinafter be described in more detail, activates lead TSCRD to enable gate 604 to enter the time slot count then accruing in counter 601 into time slot register 605. So long as flip-flop PSEVTS is set the time slot number furnished register 605 must be an even-numbered time slot. For even-numbered time slots an output derived from the least significant stage of shift register 605 partially primes gate PCSEVTS for the resetting of flip-flop PSEVT. Gate PCSEVTS will be fully enabled to clear the select-only-even-time-slots flip-flop PSEVTS by the set output of cycle flip-flop PBCYL. Flip-flop PSEVTS will be cleared when an idle time slot is found during the first cycle or at the end of the first cycle if no even time slot is found. Accordingly, during the second cycle of time slot counting an odd time slot may be selected.

In terms of the illustrative embodiment where 128 time slots may be assigned to establish communications connections in the time division communications bus, time slot register 605 will be a seven stage register in which the state of the least significant stage indicates whether an even or an odd-numbered time slot is being counted. When an odd-numbered time slot is being counted, this stage provides a signal which enables the upper-most input of gate PCSEVTS.

In addition to toggling the aforementioned flip-flops, the activation of gate PBCYLI also sets the delayed end-cycle flip-flop PBCDE consisting of cross-coupled NAND gates PBCDE1 and PBCDEO. The setting of the delayed end cycle flip-flop assures that lead PBCDE will be energized throughout a complete cycle for the enabling of logic circuit 607. Logic circuit 607 when enabled converts the decoded commands from the main controller into signals that are applied to buses MS, WS, ML and WL for loading and clearing the line and station port shift registers.

Network Auditing

Figure 13:
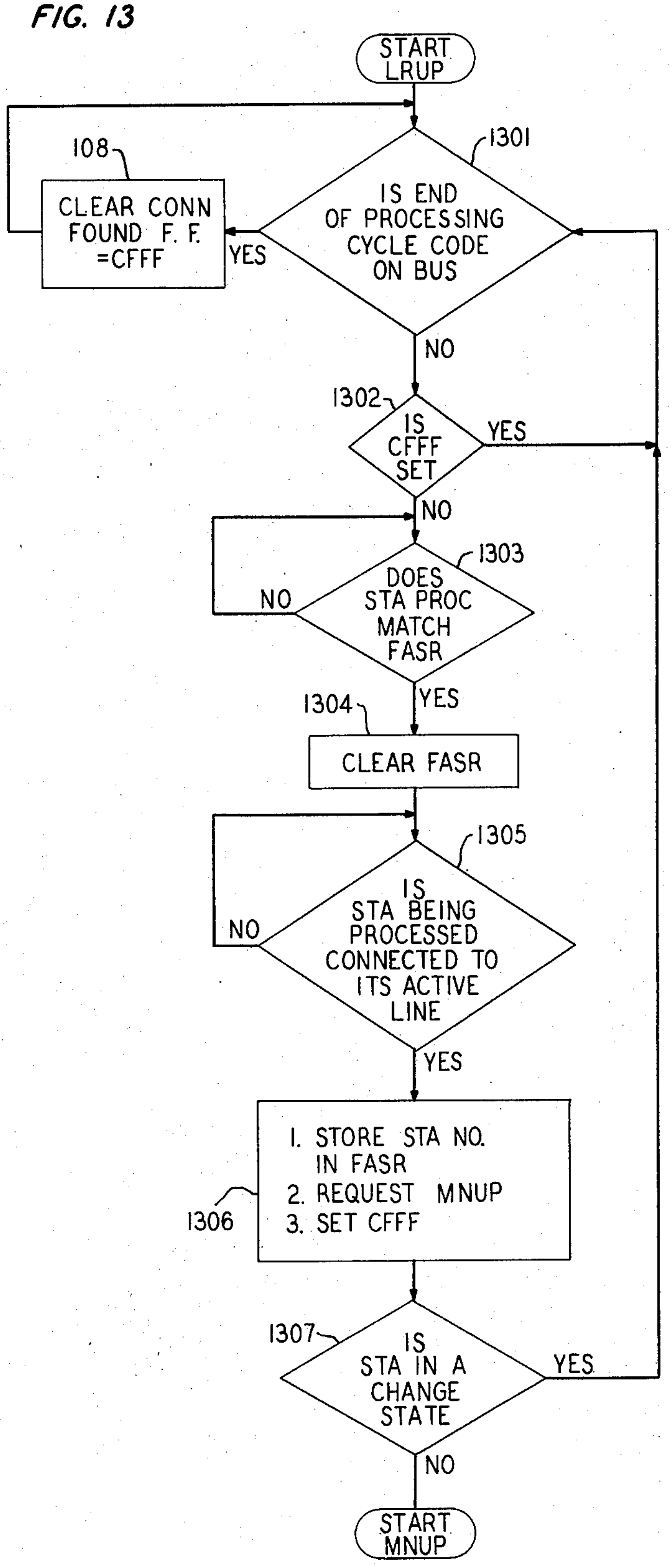
FIGS. 13, 14, 15A and 15B show flow diagrams for auditing network connections.
Figure 14:
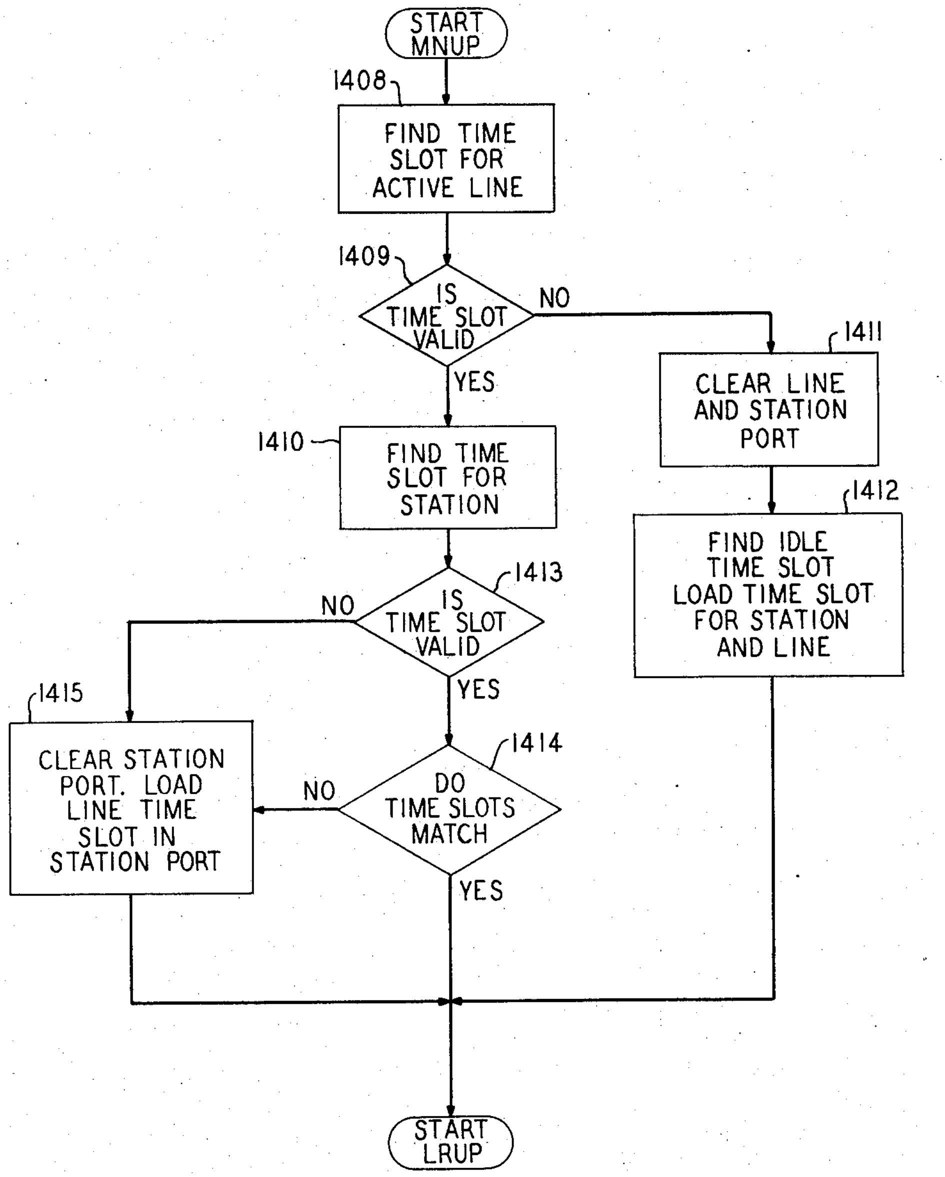
Figure 15A:
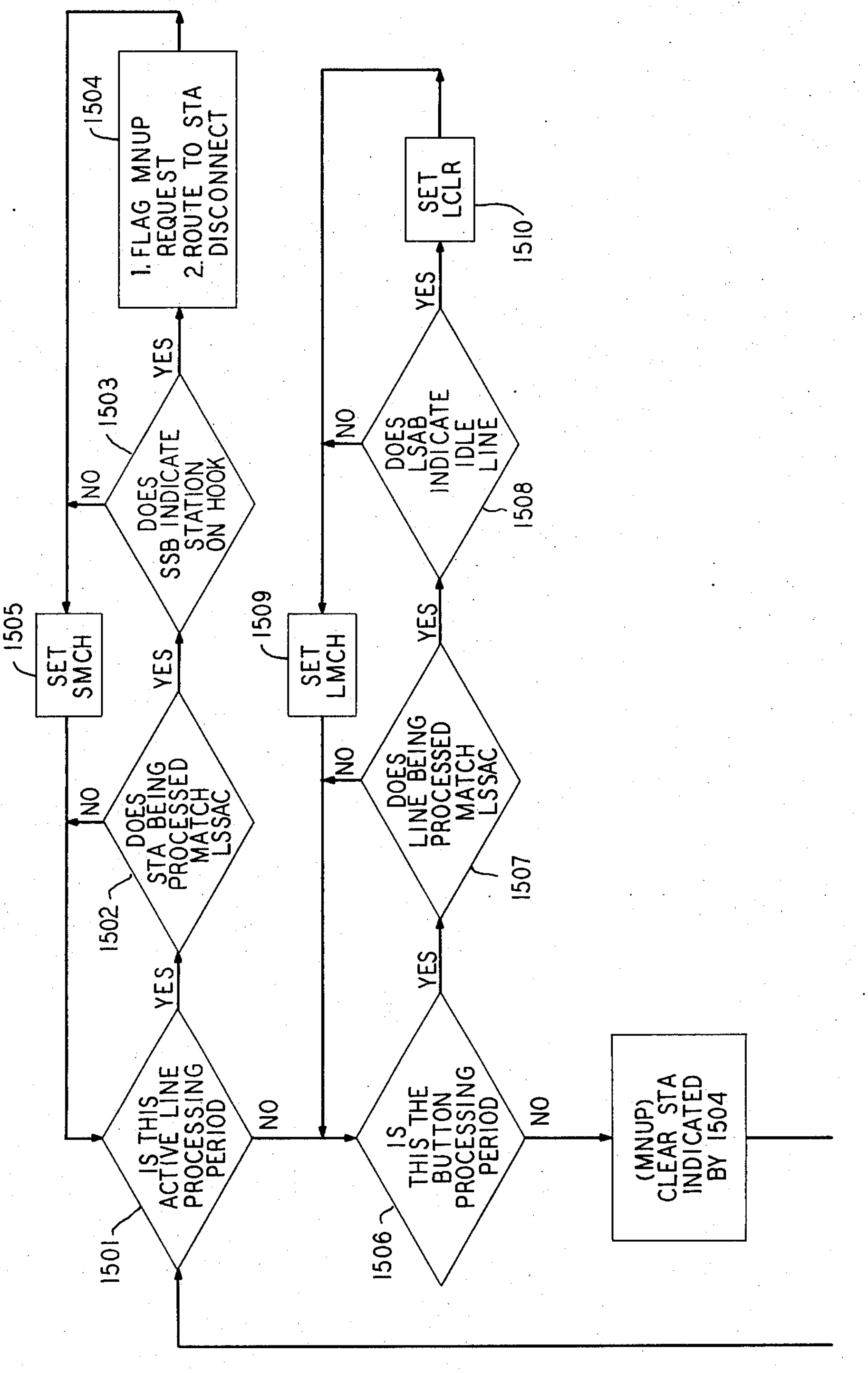

Because there is no possibility of establishing a "hard wire" connection between a station and line in the time division communication network of the illustrative embodiment, it is advisable periodically to interrogate the network to determine if ports which are shown as being connected in activity memory 1101 are indeed properly connected in the network. Two modes of auditing network connections are normally employed. The detailed logic for executing the two forms of network connection auditing is shown in FIGS. 6, 10, 13, 14, 15 and 15A. A "fast" audit shown in FIGS. 13 and 14 is performed by the network control logic to verify only active connections, one such connection being verified each 25 milliseconds. The time required to verify all current network connections during the fast audit is dependent upon the number of assigned time slots. Thus, if all 128 time slots are busy, all 128 connections would be verified in approximately 3 seconds. The second or "slow" mode of auditing network connections is shown in FIGS. 15 and 15A and audits all station and line ports in the network. In the key system network of the illustrative embodiment, it is possible to equip 512 stations and/or 512 lines or any lesser amount thereof. Only a fraction of the equipped ports are normally busy. In the slow audit mode, line and station numbers are processed in sequence, one number being processed during each 25-millisecond scan. If the line or station or both being audited are idle or unprogrammed, they are cleared in the network. This auditing procedure provides a constant updating of the network connections based on the relevant bytes of activity memory 1101. False network connections existing because of any malfunction should thus only persist for a few seconds before being cleared by one of the two auditing modes of operation.

FAST NETWORK AUDIT

Referring now to FIGS. 13 and 14 there are shown the details of the fast audit logic of the memory update and network control 1280 (FIG. 12). Sequencer 1120 (FIG. 11) applies an end-of-processing code on system bus 1299 every 25 milliseconds following processing of all stations. If the end-of-processing-cycle code appears on data bus 1299, logic block 1301 (FIG. 13) clears connection-found flip-flop 1282. Let it be assumed that a new cycle has just begun after an end-of-processing-cycle code has disappeared from station bus 1299. Logic block 1302 tests to ascertain that the connection-found flip-flop 1282 is not set indicating that an active connection has not yet been found in the current audit. If the connection-found flip-flop had been found to be set, logic 1301 would be reset to await the appearance of the next end-of-processing-cycle code on bus 1299 at which time the connection found flip-flop CFFF would be reset. In the illustrative embodiment only one active connection is audited during each 25 millisecond scan.

If logic 1302 detects that the connection-found flip-flop 1282 is not set, logic 1303 is activated to await the processing of the station whose number is contained in fast audit station register 1281. When the number of the station being processed matches the number in register 1281, logic 1303 activates logic 1304 to clear register 1281. The number in register 1281 just cleared is the number of the station that was audited during the last scan. After the clearing of the fast audit station register, lamp and ring update processing of the current station continues.

The function of logic 1305 is to detect an off-hook station that is connected to its active line. It does so by obtaining the switchhook status byte SSB and the active line number byte ALNB from data storage register 1230 of the main controller. When logic 1305 detects that the station being processed is one which is connected to its active line it activates logic 1306 to store that station's number in the fast audit station register 1281. Logic 1306 sets connection-found flip-flop 1282 and prepares a request to the main controller to activate logic 1408 during the memory update and network control interval (MNUP), FIG. 14, to find the time slot actually assigned the active line in the network thereby to verify whether the network reflects the condition specified by the activity memory information. In addition logic 1306 activates logic 1307 to test the VB of the station activity word to ascertain that a change of state has not occurred at the station so that logic 1408 may be operated during the memory update and network control period. If the station has a change of state, the audit logic does not attempt to verify the connection at this time.

The main controller enters the memory update and network control interval MNUP, FIG. 14, after a station's last button has been processed during the button processing period when enabled by sequencer 1120. During the time it is enabled for this purpose, the main controller generates commands to change connections in the network and to update the station line and service activity memories. When the main controller has finished its tasks, it generates an exit command and then waits until the processing of the next station begins.

In the fast network audit routine of the present embodiment, logic 1408 will be activated during the memory update and network control interval for the station currently being processed. Logic 1408, when activated, causes the network controller to report the actual time slot assigned to the active line of the station that was selected for auditing by logic 1305. The time slot assignment is obtained by the main controller issuing a find active time slot command (FATS) to the network controller in response to which the network controller monitors the line selected busy-idle bus LSBI-associated with the group of line ports which includes the active line. The line port shift register 102 shown in FIGS. 1 and 2 for the active line will cause the LSBI- to exhibit a low signal condition during the time slot when the line port is connected to the time division communications bus. The number of the active line employed by logic 1408 appears in the ALNB of the station activity word of the station selected for auditing by logic 1305. The active line number is transferred from the data storage registers 1230 of the main controller, FIG. 12, to sequencer 1120 and entered into interface register 500, FIG. 5, which addresses the line by selecting the line centerboard, FIG. 8, serving the group of lines which includes the active line and by applying the appropriate designating code to leads BO–5 to the decoders in the centerboard to address the line itself.

Logic 1408 causes command generator 1220 to issue a find active time slot command on system data bus 1299. Sequencer 1120, FIG. 11, receives the command on bus 1299 and applies it over cable 1290 to the network controller, FIG. 6. Decoder 600, FIG. 6, receives the command and generates an output on lead PFATS. Lead PFATS when activated initiates a sequence of operations to find the active time slot assigned to the port circuit being accessed by the number supplied to interface register 500, FIG. 5. The activation of lead PFATS provides a signal to prime gates SBIE, PTATS, and PNATS in FIG. 10. Gate SBIE will have been preprimed by the activation of lead PNTENBF from the main controller at the beginning of network audit and by a timing signal on lead CYCLE applied by the output of flip-flop PBCYL, FIG. 6, at the beginning of a new frame of time slots. The signal on lead PNTENBF clears counting flip-flops CC0 and CC1.

Finding the Active Time Slot

When the line port shift register of a line selected as previously described delivers its single circulating bit at its output to define the time slot during which that line port is connected to the time division communications bus, the selected port circuit will cause its associated bus LSBI* to exhibit a low signal condition. The low signal appearing on bus LSBI* is applied to the upper input of gate NAND PSBI FIG. 10 causing a high signal at the output of this gate. The high signal at the output of gate PSBI fully enables NAND gate SBIE. The activation of gate SBIE applies a low signal to gate PTCCE which, in turn, applies a high signal to gates PTSCRD* and PTCCD.

Assuming that this is the first active time slot that has been detected in the cycle, counting flip-flops CCO and CC1 will be reset providing high signals on their 0 outputs to the left hand and center inputs of gate PTSCRD*. Gate PTSCRD* upon receiving the high signal from gate PTCCE provides a low output which is inverted by gate TSCRD and applied to lead TSCRD as a high signal to cause gate 604 in FIG. 6 to enter the 7-bit time slot number accruing in time slot counter 601 into time slot register 605. The contents of time slot register 605 will be decremented by one and then returned to the main controller FIG. 12 on command by sequencer 1120 as the time slot number assigned to the active line of the station being audited.

Verifying Time Slot Validity

The validity of the active time slot thus entered into time slot register 605 is verified by logic 1409 as follows: The high active signal appearing at the output of gate PTCCE, FIG. 10, during the active time slot becomes a low signal after the end of the time slot. The output of gate PTCCD then goes high to toggle flip-flop CC0 to record the fact that a first active time slot has been found for the active line port being audited. Accordingly, at the end of the first time slot found to be active, flip-flop C0 has been toggled to the set state producing a high signal at its 1 output and a low signal at its 0 output. Flip-flop CC0 then toggles flip-flop CC1 and the 0 output of flip-flop CC1 goes low inhibiting any further operation of gate PTSCRD* during the current frame of time slots.

At the end of the current network operation, sequencer 1120 energizes lead PBSEN priming gate PB4. GATE PB4 should receive a high signal from gate PB41 if one and only one active time slot has been found during the cycle in which case gate PB4 upon receiving a signal from lead PBSEN applies a low signal to lead PB4 to inform the main controller that a valid time slot assignment was found. Gate PB4 will have a low signal applied at its input in the event that gates PNATS or PTATS are enabled during the cycle to indicate respectively that no active time slot has been found or that two or more active time slots have been found. Gate PNATS will be enabled when its three inputs all receive high signals. The lower-most input of gate PNATS normally receives a high signal from lead PFATS. The center-most and upper-most inputs of gate PNATS will receive high signals from the 0 outputs of flip-flops CC0 and CC1 if these flip-flops have not been toggled by the detection of the first active time slot during the cycle. On the other hand, gate PTATTS will have all of its inputs in the high signal condition in the event that two or more active time slots have occurred during the cycle. The center input receives a high signal from lead PFATS. The lower-most input of gate PTATS receives a high signal from the one output of flip-flop CC1 after the end of the first detected active time slot. If a second active time slot should be detected, flip-flop CC0 will be toggled to the 0 state and its 0 output will apply a high signal to the upper-most input of gate PTATS fully enabling this gate.

In the event that logic 1409 determines that the time slot assigned to the line being audited is not valid either because no time slot has been assigned to the line port or because two or more time slots have been assigned, it will return a task-not-complete code, i.e., a high signal on lead PB4 and a low signal on lead PB3, to the system data bus. The audit logic in memory update and network control 1280 in the main controller FIG. 12 receives the task-not-complete code and controls command generator 1220 to apply a clear shift register command on system data bus 1299. Decoder 600 in FIG. 6, receives the clear shift register command and, in response thereto, activates lead CLSR. Activation of lead CLSR causes circuit 607 to maintain WRITE lead WS in the low signal condition throughout the cycle causing the shift register in the port circuit selected by the main controller to be cleared.

After logic 1411 has cleared the line and station port circuit shift registers responsive to the CLSR command, logic 1412 is activated to generate a find-idle time slot command and then to load the port circuit shift registers for the line and station ports with a bit which will assign the idle time slot to these ports. Logic 1412 causes the main controller to send a find-idle time slot command to decoder 600 via system data bus 1299, sequencer 1120 and cable 1290.

Logic 1410 is next activated to find the time slot assigned to the station being audited. The number of the station being audited is entered into interface register 500 and the port circuit for the station being audited is selected. Whe the station port shift register for the active station delivers the time slot defining bit to its output, bus SBI- will exhibit the low signal condition. The low signal appearing on lead SSBI- is applied to gate SBI appearing as a high input at its output and at the input to NAND gate SBIE. In similar fashion to the manner in which logic 1409 tested the validity ofthe time slot for the active line, logic 1413 tests the validity of the time slot assigned to the station being audited. When the time slot assigned to the station being audited is detected, lead TSCRD is energized to exhibit a high signal condition and the time slot count accruing in counter 601 FIG. 6 is time slot shift register 605 by gate 604. The time slot number, decremented by one, is returned to the main controller over system data bus 1299 when sequencer 1120 energizes lead DNC. This time slot number is compared in the main controller with the time slot number previously obtained for the active line. In the event that the time slot numbers do not agree, memory update and network control 1280 controls decoder 600 to produce the CLSR command.

In the event that the station and line time slots do not agree the main controller issues the CLSR command which is received by decoder 600 in FIG. 6. Simultaneously, the main controller furnishes the time slot number which is to be cleared to match circuit 602. Decoder 600 energizes lead CTTS and gate PCTTS is enabled when match circuit 602 detects that time slot counter 601 has arrived at the number of the time slot which is to be cleared. Logic circuit 607 energizes leads MS and WS for the station ports and leads MS and WL for the line ports to cause all of the ports to clear their shift registers of the designated time slot.

Figure 15B:
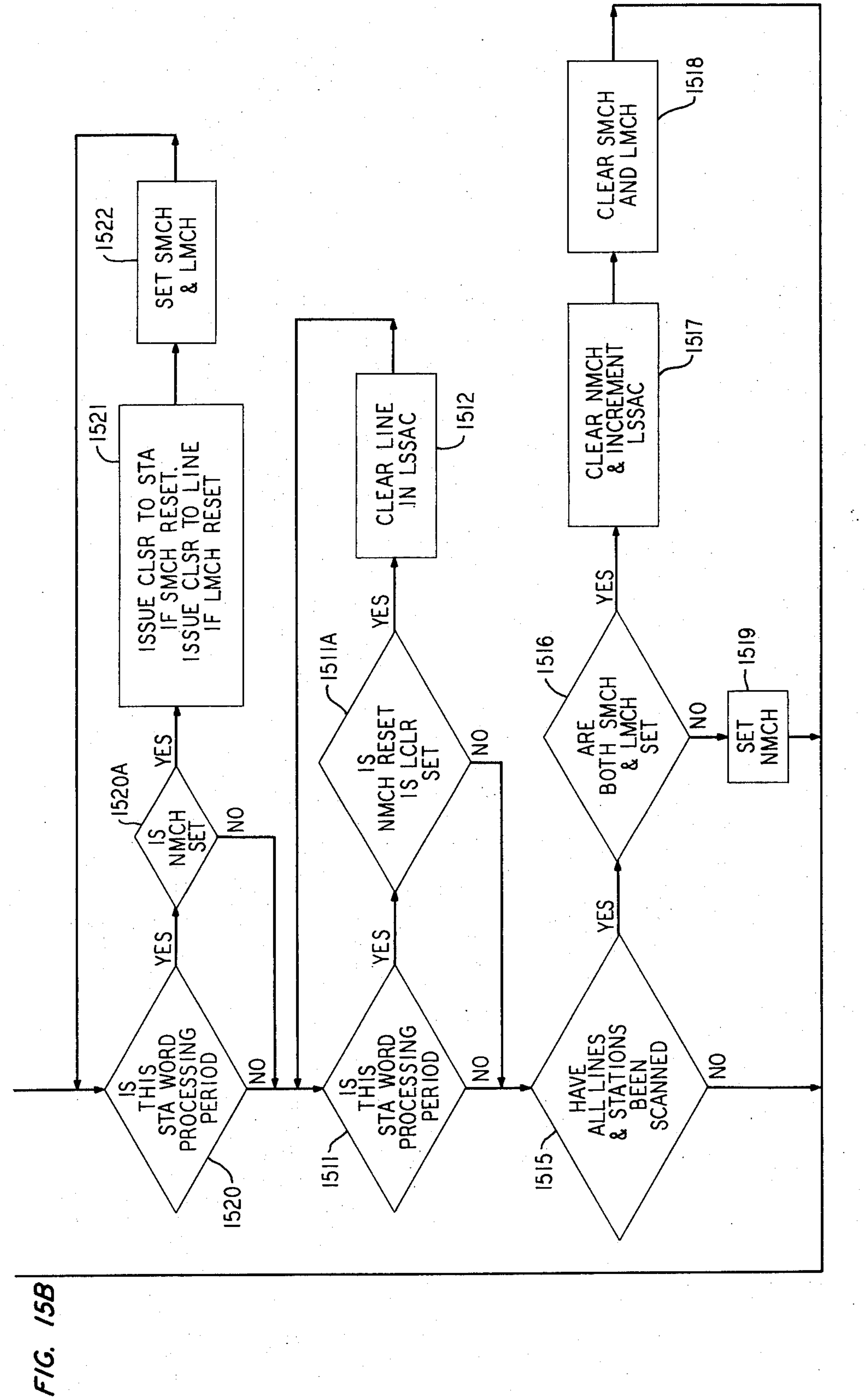

Slow Network Audit (FIGS. 15A and 15B)

Network connections are also audited on a sequential counting basis. During each 25-millisecond interval one idle station or line may be cleared in the network. A counter denominated the line and station slow audit counter LSSAC sequentially counts the number of each line and station having a network appearance. When the number in the slow audit counter matches the number of a line or station being processed and the station is not connected or the line is idle, the slow audit logic generates a CLSR command to zero the respective port shift register. Slow audit is thus a check on system performance and also takes care of the possibility that noise impulses may have erroneously caused time slot bits to appear in a port shift register.

Referring now to FIG. 15 logic 1501 detects the occurrence of the active line processing period and activates logic 1502 which attempts to match the number of the station having the active line being processed with the number in line or station slow audit counter LSSAC. If logic 1502 obtains a match logic 1504 tests whether the station is on-hook or idle and if so loads logic 1504 with a flag for station disconnect during memory and network update. Logic 1505 is next actuated to set station number match flip-flop SMCH.

During the button processing interval, logic 1506 activates logic 1507 to test whether the number of the line corresponding to the button being processed matches the number in line or station slow audit counter LSSAC. If the numbers match, logic 1508 tests whether the line or service activity byte LSAB in activity memory indicates that the line is legitimately in use the line match flip-flop LMCH is set by logic 1509. If the activity memory indicates that the line is idle, logic 1508 sets the line-clear flip-flop and then logic 1509 is activated to set the line-match flip-flop LMCH.

Referring now to FIG. 15B, logic 1520 detects the occurrence of the station word processing period and, assuming that no-match flip-flop NMCH has not been set and the line-clear flip-flop has been set (by logic 1510 in FIG. 15A), logic 1512 is enabled to clear from the network the line whose number is in the line and station slow audit counter LSSAC.

Logic 1515 is activated after all the lines and stations have been scanned. Logic 1516 tests whether both the station match flip-flop SMCH, as well as the line-match LMCH, have been set. If both have not been set, logic 1519 sets no-match flip-flop NMCH. Setting of the no-match flip-flop will be detected by logic 1520A during the station word processing period. Depending upon which of flip-flops SMCH and LMCH are reset, logic 1521 will issue the clear shift register command CLSR to either the station port or line port shift register and wild then set both the station match and line match flip-flops via logic 1522. If logic 1516 detects that both the station match and line match flip-flops are set, logic 1517 is activated to clear no-match flip-flop NMCH and to increment the number in the line and station slow audit counter to the number of the next sequential line or station in the system. Thereafter, logic 1518 clears the station and line match flip-flops and the system is ready to audit another station or line.

Other Time Slot Commands

In addition to the foregoing described timed slot commands, the main controller via sequencer 1120 may also issue a clear total time slot command, CTTS. This command is for the purpose of clearing a time slot from a plurality of port circuit shift registers after a number of ports have been assigned the same time slot as, for example, during a conference connection. All of the ports assigned this number may be cleared without the necessity of separately accessing each of the ports involved in the connection. When CTTS command is issued lead CTTS at the output of decoder 600 is energized. Simultaneously, the 7-bit time slot number is supplied to match circuit 602 by the main controller. Time slot counter 601 counts clock pulses delivered on lead CLK. When time slot counter 601 begins a new cycle of time slots, gate PBCYLI sets the flip-flop comprising gates PBCDE1 and PBCDE0. The setting of this flip-flop energizes lead PBCDE for priming logic circuit 607. When time slot counter 601 arrives at the time slot number stored in match circuit 602, match circuit 602 energizes lead PTSMTCH. The simultaneous energization of lead PTSMTCH and CTTS activates gate PCTTS. The activation of gate PCTTS enables logic circuit 607 to apply a 0 signal to the station port mark and write buses MS and WS and to the line port mark and write buses ML and WL. The 0 signal causes the time slot recorded in the port time slot shift register(s) to be erased, as will now be more particularly explained.

Responsive to the activation of gate PCTTS and lead PBCDE, circuit 607 will apply a 0 signal to the aforementioned station and line port mark and write leads. Interface register 500, not having received a station or line number from sequencer 1120, will apply 0 select signals to the station and line centerboard circuits and the decoders in the centerboard circuits will accordingly apply 0 signals to the station port select leads SPS- and SBS- (see FIG. 2) and to the line port select leads LPS- and LBS- leads (see FIG. 7) of the station and line port circuits, respectively. Accordingly, the line and station port circuits will receive 0 signals on their respective MARK, WRITE and SELECT leads responsive to which a 0 bit will be written into the port shift register. Referring, for example, to station port circuit 3 of FIG. 2, low signals appearing on the MARK and WRITE leads will activate NOR gate MW to apply a high signal to the upper-most input of NOR gate SRD. Gate SW receives 0 signals on its WRITE and SELECT inputs and it too applies a high signal to an input of gate SRD. Gate SM receives low input signals from the MARK and SELECT leads and applies a high signal to the lower input of shift register feedback gate SRFB. The high signal is applied to the lower input signal to gate SRF regardless of the state of the output bit of shift register 301. Accordingly, only one input of gate SRD is in the low signal condition and the output of gate SRD accordingly applies a low input to shift register 301. Thus, with the MARK and SELECT leads low, feedback of the shift register output to input is prevented. Accordingly, it is an aspect of the CCTS command that all ports having the time slot registered in time slot shift register 605 will be cleared of this time slot without requiring the ports to be individually accessed by loading their port number into interface register 500.

Figure 9:
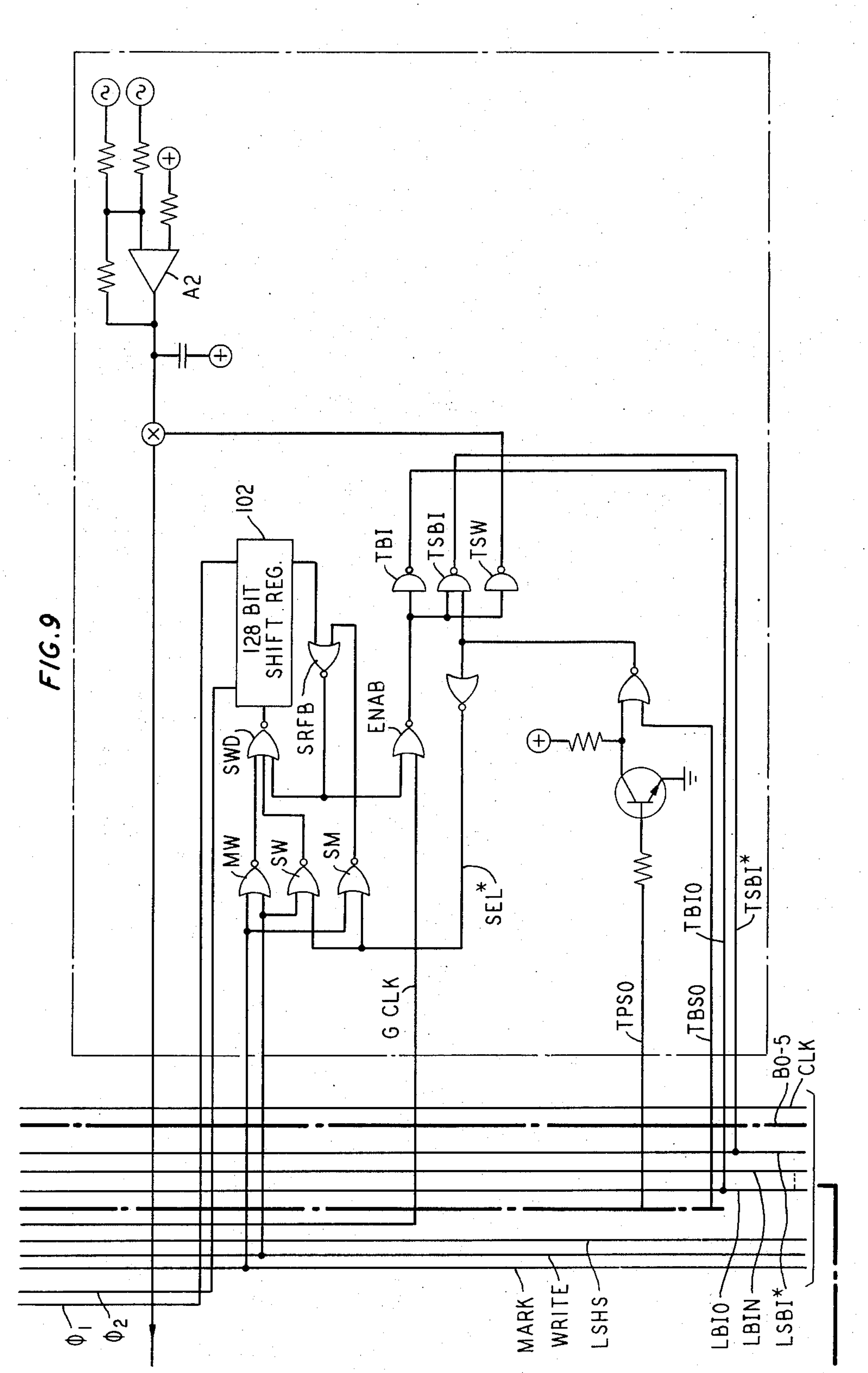
FIG. 9 shows a tone trunk.

In addition to the foregoing commands, the main controller, via sequencer 1120 and cable 1290, may issue a selective clear time slot command CLTS. The CLTS command is similar to the CTTS command except that it is limited in scope to clear a specific time slot and only from a selected port circuit whereas the CTTS command clears a specific time slot from all port circuits having that time slot assigned. The CLTS command may be issued to clear a specific time slot in a port circuit such as a tone port circuit (FIG. 9) whose port shift register 102 would normally have more than one time slot assigned. A tone port circuit is a circuit which is similar to the line circuit of FIG. 7 except that a tone generator is connected between the tip and ring leads instead of a central office connection. The port shift register 102 of a tone port circuit would then have several time slot bits entered therein for supplying tone to different station circuits during different time slots. When the main controller determined that the tone was to be removed from a specific station, the appropriate tone port would be selected and only the specified time slot would be cleared.

What has been described is considered only illustrative of the principles of this invention. Numerous other embodiments can be devised by one skilled in the art without departing from the spirit and scope thereof.

What is claimed is:

1. In an electronic key telephone system having a plurality of line circuits, a plurality of conventional telephone sets and a plurality of electronic key telephone station sets wherein the electronic key telephone sets transmit switchhook supervision to and receive lamp and ringer control information from a central control unit through a predetermined pulse sequence over a data link independent of the speech path but wherein the conventional station sets transmit switchhook supervision over the speech path, the combination comprising a time division switching network, a port circuit associated with each of said telephone sets and line circuits, each said port circuit appearing in said network and including a line transformer relay for repeating the supervisory state of the speech path of the associated one of said line circuits or telephone sets to another one of said telephone sets or line circuits having a respective port circuit appearing in said network, means associated with said port circuits serving said conventional telephone sets for monitoring said predetermined pulse sequence from said central control unit to derive a sequence of synchronizing signals, and means controlled by said line transformer relay in one of said last-mentioned port circuits for transmitting to said central control unit the switchhook supervision of a respective one of said conventional telephone sets under the control of said synchronizing signals derived by said monitoring means.

2. In a key telephone system having a plurality of electronic key telephone station sets each having a voice path appearing in a switching network controlled by a central control unit and each having a data link independent of said voice path for receiving from said central control unit a sequence of pulses for controlling the state of the station set's key lamps and ringer and for transmitting to said central control unit a compelled sequence of pulses containing data regarding the station set's switchhook and key button statuses, the combination comprising a conventional telephone set and a port circuit for affording said set a voice path appearance in said network, means associated with said port circuit for ascertaining the supervisory state of said associated telephone set's voice path, means for monitoring said sequence of pulses from said central control unit and for deriving synchronizing signals therefrom, and means controlled by said supervisory state means and said synchronizing signals for transmitting said supervisory state of said conventional telephone set voice path to said central control unit during the interval of one of said compelled sequence of pulses.

3. In a key telephone system according to claim 2 the combination wherein said means for monitoring includes flip-flop means for counting the occurrence of a predetermined one of said pulses from said central control unit and wherein said means for transmitting said supervisory state of said conventional telephone set includes gating means controlled by said counting means.

4. A key telephone system comprising a plurality of electronic key telephone station sets, a central control unit, a time division switching network, a plurality of port circuits for affording said telephone sets a voice path appearance in said network, data bus means for transmitting station control information between said port circuits and said central control unit, a data transmitter-receiver in each of said port circuits, a data link between each of said electronic telephone sets and said port circuit data transmitter-receiver, said transmitter-receiver being adapted to relay signals between said central control unit data bus and said telephone set data link, said electronic telephone set returning a compelled response pulse for each pulse sent by said control units, a conventional telephone set, a port circuit for affording said conventional telephone set a voice path appearance in said network, means for monitoring said control unit data bus to derive a sequence of synchronizing signals, means for ascertaining the supervisory state of said voice path of said conventional telephone set, and means controlled by said supervisory state ascertaining means and said synchronizing signals deriving means for transmitting said supervisory state of said voice path to said central control over said central control unit data bus.

5. A key telephone system according to claim 4 wherein said central control unit transmits a first pulse over said data bus to control the ringer of a selected one of said electronic telephone sets and normally elicits therefrom a pulse representing the switchhook state of said selected one of said sets and wherein said means controlled by said supervisory state ascertaining means and said deriving means transmits said supervisory state of said voice path of said conventional telephone set over said control unit data bus during said interval when said switchhook status of said electronic telephone set is normally elicited.

6. In an electronic key telephone system having a plurality of line circuits, a plurality of conventional telephone sets, and a plurality of electronic key telephone station sets wherein the electronic sets transmit supervisory information over a data link independent of the speech path but wherein the conventional telephone sets transmit supervisory information over the speech path, the combination comprising switching network means, a port circuit connecting each of said telephone sets and line circuits with said switching network means, means for applying a predetermined pulse sequence to said port circuits, and an interface circuit associated with said port circuits serving said conventional telephone sets, said interface circuit including means for monitoring said predetermined pulse sequence to derive a sequence of synchronizing signals and means responsive to said monitoring means for transmitting to said central control unit an indication of the supervisory state of a respective one of said conventional telephone sets.

7. In a common control communications switching system having a plurality of communications port circuits each capable of exhibiting a plurality of service states, a central controller, and a data bus connecting said central controller to said port circuits wherein said central controller transmits a predetermined pulse sequence over said data bus to said port circuits and elicits therefrom a compelled response pulse sequence, each response pulse of said sequence corresponding to one of said service states, the combination comprising a conventional telephone set, means for ascertaining the superivsory state of said conventional telephone set, and an interface circuit coupled to said ascertaining means and to said data bus, said interface circuit being responsive to said predetermined pulse sequence for transmitting said supervisory state to said central controller as one pulse of said compelled response pulse sequence.

8. In a common control communications switching system according to claim 7 wherein said interface circuit includes first means coupled to said data bus for generating a synchronizing signal incident to the termination of a predetermined pulse of said predetermined pulse sequence and second means coupled to said data bus for returning said supervisory state to said central controller under the control of said synchronizing signal.

9. In a common control communications switching system having a switching network in which a plurality of communication port circuits appears, each of said port circuits being capable of exhibiting a plurality of service states, a central controller and a data bus connecting said central controller to said port circuits wherein said central controller is adapted to transmit a predetermined pulse sequence over said data bus to said port circuits and is adapted to receive over said data bus a response pulse sequence within a predetermined interval after said first-mentioned pulse sequence, the combination comprising a further communications port circuit appearing in said switching network, said circuit being capable of exhibiting a lesser plurality of service states then said plurality of service states exhibitable by said first mentioned communication port circuits, means for enabling said further communication port circuit to convey said lesser plurality of service states to said central controller, said enabling means including means for detecting the occurrence of a predetermined pulse of said predetermined pulse sequence, and means controlled by said detecting means for applying a response pulse to said data bus incident to the termination of said predetermined pulse.

* * * * *